(12) United States Patent
Seo et al.

(10) Patent No.: US 9,918,131 B2
(45) Date of Patent: Mar. 13, 2018

(54) BROADCAST RECEIVING DEVICE

(71) Applicant: LG ELECTRONICS INC., Seoul (KR)

(72) Inventors: Chuhyun Seo, Seoul (KR); Taejin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/038,550

(22) PCT Filed: Jan. 29, 2015

(86) PCT No.: PCT/KR2015/000998
§ 371 (c)(1),
(2) Date: May 23, 2016

(87) PCT Pub. No.: WO2015/115850
PCT Pub. Date: Aug. 6, 2015

(65) Prior Publication Data
US 2016/0301976 A1    Oct. 13, 2016

(30) Foreign Application Priority Data

Jan. 29, 2014 (KR) .......................... 10-2014-0011219
Feb. 13, 2014 (KR) .......................... 10-2014-0016667

(51) Int. Cl.
*G06F 3/00* (2006.01)
*G06F 13/00* (2006.01)
(Continued)

(52) U.S. Cl.
CPC ...... *H04N 21/4622* (2013.01); *H04N 21/4821* (2013.01); *H04N 21/4854* (2013.01); *H04N 21/6106* (2013.01)

(58) Field of Classification Search
None
See application file for complete search history.

(56) References Cited

U.S. PATENT DOCUMENTS

| 7,152,236 B1 * | 12/2006 | Wugofski | H04N 5/44543 |
| | | | 348/E5.105 |
| 7,496,946 B1 * | 2/2009 | Wehmeyer | G06F 3/04817 |
| | | | 725/48 |

(Continued)

FOREIGN PATENT DOCUMENTS

JP          5367839 B2    12/2013
KR    10-2009-0103111 A   10/2009
(Continued)

*Primary Examiner* — William J Kim
(74) *Attorney, Agent, or Firm* — Birch, Stewart, Kolasch & Birch, LLP

(57) ABSTRACT

A broadcast receiving device is disclosed. The broadcast receiving device includes: a data storage unit; a communication unit configured to receive a first electronic program guide (EPG) through a broadcast network and to receive a second EPG through the Internet; and a controller. The controller may be configured to: process the first EPG to generate first broadcast-related information, process the second EPG to generate second broadcast-related information, make the first broadcast-related information and the second broadcast-related information into databases having different data structures and store the databases in the data storage unit. In addition, when a broadcast-related information request is received from an application being executed, the controller may selectively search a database corresponding to at least one of the first broadcast-related information and the second broadcast-related information to obtain requested broadcast-related information and to deliver the obtained broadcast-related information to the application.

8 Claims, 23 Drawing Sheets

(51) Int. Cl.
  *H04N 5/445*    (2011.01)
  *H04N 21/462*   (2011.01)
  *H04N 21/482*   (2011.01)
  *H04N 21/485*   (2011.01)
  *H04N 21/61*    (2011.01)

(56) References Cited

U.S. PATENT DOCUMENTS

| | | | |
|---|---|---|---|
| 2005/0283799 A1* | 12/2005 | Domegan | H04N 5/44543 725/38 |
| 2008/0022298 A1* | 1/2008 | Cavicchia | H04N 5/44543 725/25 |
| 2009/0172736 A1* | 7/2009 | Tsui | H04N 5/44543 725/40 |
| 2009/0249402 A1 | 10/2009 | Lee | |
| 2010/0023504 A1* | 1/2010 | Baris | G06F 17/30545 707/E17.014 |
| 2010/0269140 A1 | 10/2010 | Shin et al. | |
| 2012/0206493 A1 | 8/2012 | Koike et al. | |
| 2013/0205320 A1 | 8/2013 | Kim et al. | |

FOREIGN PATENT DOCUMENTS

| | | |
|---|---|---|
| KR | 10-2010-0115591 A | 10/2010 |
| KR | 10-2012-0081494 A | 7/2012 |
| KR | 10-2013-0090344 A | 8/2013 |

\* cited by examiner

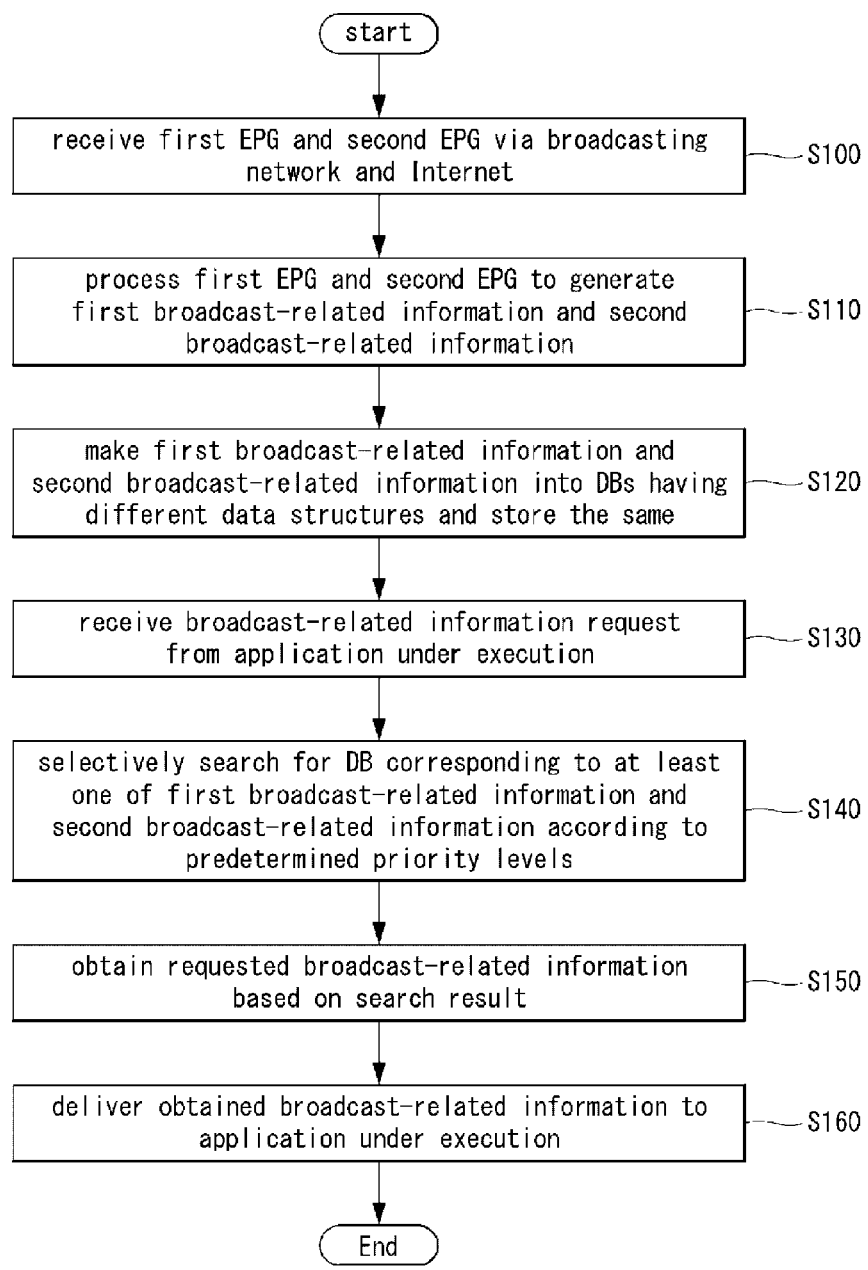

FIG. 3

| broadcast guide | | | | |
|---|---|---|---|---|
| 7-1 KBS2 HD | | | | 2014/01/13 14:57 PM |
| whole channel | 1/13 Monday | | | |
| | 15:00 | | | 16:00 |
| 6-1 SBS HD | I see hometown | genuine Korea's taste | | 2013 Korean |
| 7-1 KBS2 HD | Quiz show | buzz-buzz | hooters | TV kindergarden |
| 9-1 KBS1 HD | TV gallery | Testimony of 4.19 ge... | | 4 o'clock... |
| 10-1 EBS DTV | For foreigners... | pororo | kkemi | dingdongdaeng |
| 11-1 MBC DTV | unification... | MBC network special | | Father, whe... |

(a) EPG-based broadcast-related information according to prior art

OBLIVION
movie/action
11:00 - 12:00
director : XXX
lead role : XXX
<outline>
----------------
--------

(b) EPG-based broadcast-related information according to present invention

FIG. 6

| | air interface-based EPG | Internet-based EPG |
|---|---|---|
| Korea | · Coverage : major digital terrestrial channel<br>· availability information : program title/start time/end time/(very partial amount of) description | · Coverage : every channel (digital+analog)<br>· availability information : ProgramID/ Thumbnail/program title/start time/ end time/genre/season/episode actor/director/... |
| US | · Coverage : very low (negligible) | · Coverage : terrestrial digital channel there are variations in area/ signal strength, etc.<br>· availability information : ProgramID/ Thumbnail/program title/start time/ end time/genre/season/episode actor/director/... |
| Europe | · Coverage : digital terrestrial/ satellite/cable(variations in environments of countries are significant<br>· availability information : program title/start time/ end time/.../genre information | · Coverage : digital terrestrial/ satellite/cable(variations in environments of countries are significant)<br>· availability information : program title/start time/end time/ genre/season/episode/actor/director... → variations in richness are significant |

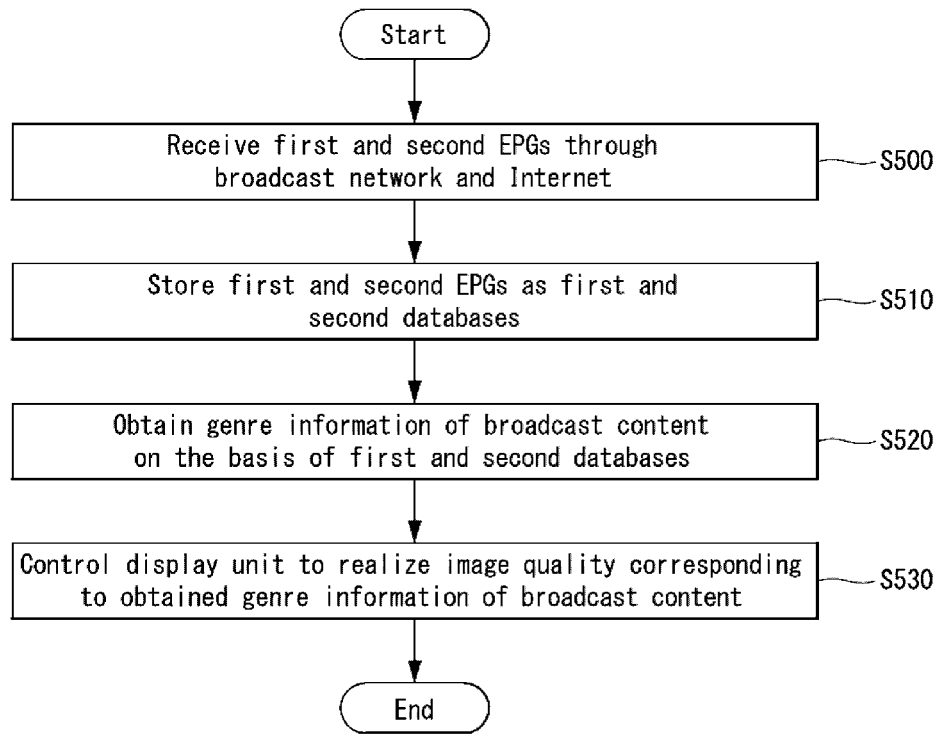
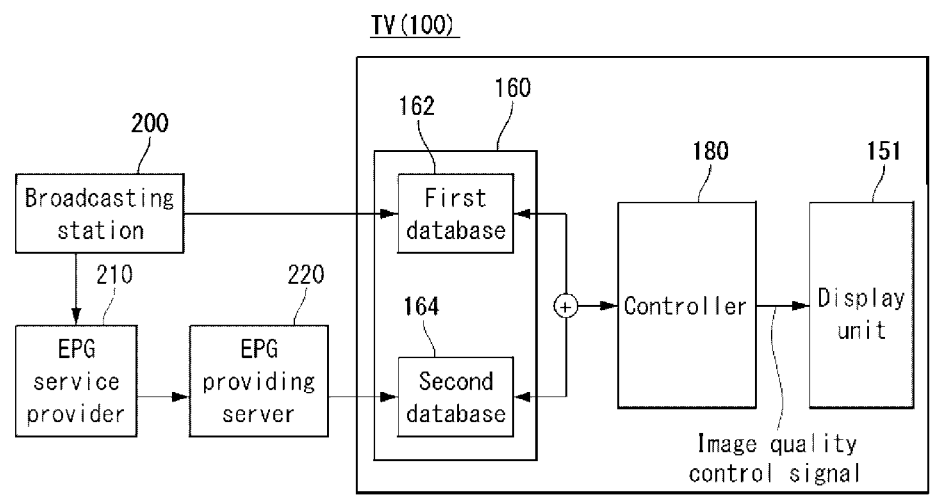

FIG. 16
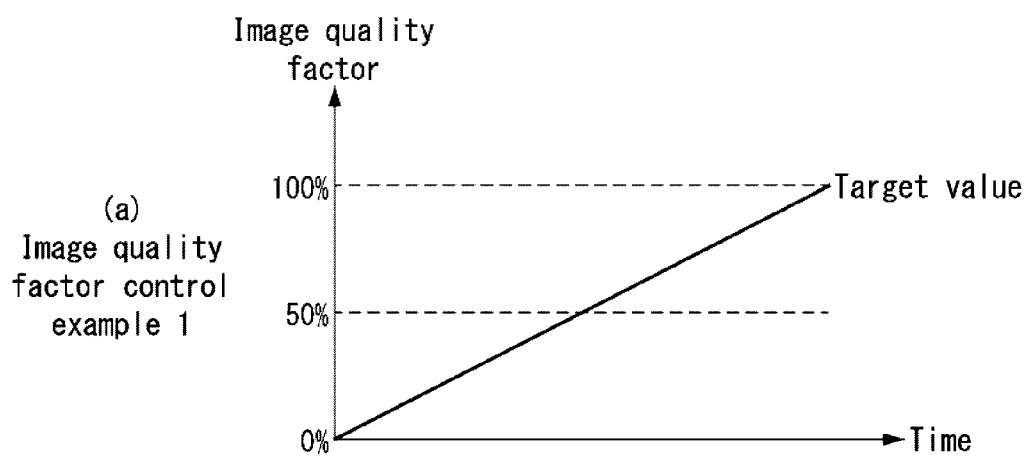
(a) Image quality factor control example 1
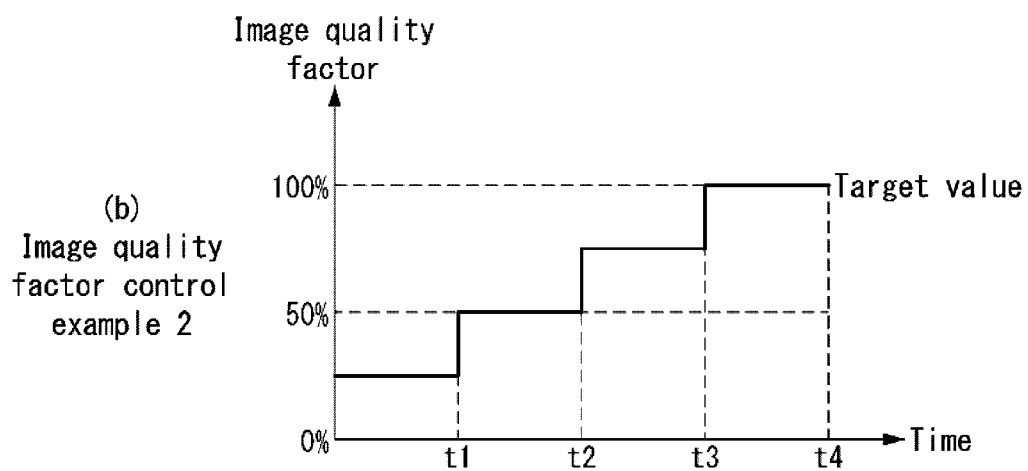
(b) Image quality factor control example 2

FIG. 18
(a) Before image quality control
(b) After image quality control

[Image quality control for divided portions of News content]

[Image quality factor control for divided portions of content]

BROADCAST RECEIVING DEVICE

CROSS REFERENCE TO RELATED APPLICATIONS:

This application is the National Phase of PCT International Application No. PCT/KR2015/000998, filed on Jan. 29, 2015, which claims priority under 35 U.S.C. 119(a) to Patent Application Ser. Nos. 10-2014-0011219, filed in Republic of Korea on Jan. 29, 2014, and 10-2014-0016667 filed in Republic of Korea on Feb. 13, 2014, all of which are hereby expressly incorporated by reference into the present application.

TECHNICAL FIELD

The present invention relates to a broadcast receiving device and, more specifically, to a broadcast receiving device which can control image quality of a display unit or audio output characteristics of an audio output unit on the basis of EPGs received through a plurality of networks.

BACKGROUND ART

Currently, a majority of countries provide broadcast signals and electronic program guides (EPG) as additional information corresponding to broadcast signals via an over-the-air interface. Such EPGs provided via the over-the-air interface (hereinafter, referred to as "air interface-based EPG") are limited in capacity, for example a limitation in providing various types of broadcast-related information.

Thus, EPG providing services that generate an EPG including richer broadcast-related information with respect to broadcasting channels based on EPG information provided from a broadcasting station, and provide the generated EPG via the Internet has been activated.

DISCLOSURE

Technical Problem

An object of the present invention is to provide a broadcast receiving device which can selectively search for broadcast-related information on the basis of air interface-based EPGs and broadcast-related information on the basis of Internet-based EPGs when a broadcast-related information request is received from an application being executed and provide the requested broadcast-related information to the application.

Another object of the present invention is to provide a broadcast receiving device which can provide richer broadcast-related information by merging and managing air interface-based EPGs and Internet-based EPGs.

Yet another object of the present invention is to provide a broadcast receiving device which can control image quality of a display unit on the basis of EPGs received through a plurality of different networks.

The object of the present invention is not limited to the aforesaid, but other objects not described herein will be clearly understood by those skilled in the art from descriptions below.

Technical Solution

In an aspect of the present invention to accomplish the object, a broadcast receiving device includes: a data storage unit; a communication unit configured to receive a first electronic program guide (EPG) through a broadcast network and to receive a second EPG through the Internet; and a controller.

The controller may be configured to process the first EPG to generate first broadcast-related information, to process the second EPG to generate second broadcast-related information, to make the first broadcast-related information and the second broadcast-related information into databases having different data structures and to store the databases in the data storage unit. In addition, when broadcast-related information request is received from an application being executed, the controller may be configured to selectively search a database corresponding to at least one of the first broadcast-related information and the second broadcast-related information to obtain requested broadcast-related information and to deliver the obtained broadcast-related information to the application.

The controller may be configured to obtain the requested broadcast-related information from the first broadcast-related information when the Internet is not connected and to obtain the requested broadcast-related information from the second broadcast-related information or merge and analyze the first and second broadcast-related information to obtain the requested broadcast-related information when the Internet is connected.

Priorities of the first broadcast-related information and the second broadcast-related information may vary depending on the requested broadcast-related information or the application being executed.

When specific broadcast-related information is not included in one of the first and second broadcast-related information and is included in the other, and a request for the specific broadcast-related information is received, the controller may assign a higher priority to the other broadcast-related information for the specific broadcast-related information.

When the controller obtains specific broadcast-related information requested by the application being executed by searching for both the first and second broadcast-related information, the controller may select information retrieved from one of the first broadcast-related information and the second broadcast-related information on the basis of reliability priority predetermined for the specific broadcast-related information when search results with respect to the specific broadcast-related information in the first and second databases are not identical.

The priorities of the first broadcast-related information and the second broadcast-related information may vary according to according to a country in which the broadcast receiving device is driven. Here, when a country determined on the basis of the first EPG differs from a country determined on the basis of the second EPG, the controller may select the country determined on the basis of the first EPG as a country in which the broadcast receiving device is driven and change an Internet address for receiving EPGs through the Internet to an Internet address determined in advance for the selected country.

When the country in which the broadcast receiving device is driven is determined to be a predetermined specific country, the controller may merge and analyze the first and second broadcast-related information, to make the same into a database and to store the database in the data storage unit.

In another aspect of the present invention to accomplish the object, a broadcast receiving device includes: a data storage unit; a communication unit configured to receive a first EPG through a broadcast network and to receive a second EPG through the Internet; and a controller. The controller may be configured to merge and process the first and second EPGs to generate broadcast-related information, to make the generated broadcast-related information into a database and to store the database in the data storage unit. When a broadcast-related information request is received from an application being executed, the controller may search the data storage unit to obtain requested broadcast-related information and deliver the obtained broadcast-related information to the application.

The controller may be configured to store specific data as the broadcast-related information irrespective of priorities of the first and second EPGs, wherein the specific data is not included in one of the first and second EPGs and is included in the other.

The controller may be configured to generate broadcast-related information on the basis of data included in an EPG selected from the first and second EPGs according to priorities applied to the first and second EPGs when data included in the first EPG and data included in the second EPG collide.

The controller may be configured to store information of a specific category in the data storage unit and manage the information of the specific category and, when the Internet is not connected, to correlate the information of the specific category with broadcast-related information generated on the basis of the first EPG and provide the correlated information, the information of the specific category not being included in the first EPG.

In another aspect of the present invention to accomplish the object, a broadcast receiving device includes: a data storage unit; a communication unit configured to receive broadcast content and a first EPG through a broadcast network and to receive a second EPG through the Internet; a display unit configured to output a video signal of the broadcast content; and a controller.

The controller may be configured to make the first EPG into a first database and store the first database in the data storage unit, to make the second EPG into a second database and store the second database in the data storage unit, to obtain genre information of the broadcast content on the basis of the first and second databases, and to control the display unit to realize image quality corresponding to the obtained genre information of the broadcast content.

The controller may be configured to obtain subgenre information of the broadcast content on the basis of the first and second databases and to control the display unit to realize image quality corresponding to the obtained subgenre information.

The controller may be configured to obtain image quality control information for divided portions of the broadcast content on the basis of the first and second databases and to control the display unit to control image quality of the broadcast content for the divided portions of the broadcast content on the basis of the obtained image quality control information for the divided portions.

The controller may be configured to analyze an audio signal of the broadcast content and to control the display unit to realize image quality corresponding to a result of analysis of the audio signal.

The controller may be configured to adjust at least one image quality factor in stages such that image quality corresponding to the obtained genre information of the broadcast content is realized.

The controller may be configured to control the display unit to realize audio output characteristics corresponding to the obtained genre information of the broadcast content.

The controller may be configured to obtain the genre information of the broadcast content, extracted from the first and second databases, as genre information of the broadcast content when the genre information extracted from the first database is equal to the genre information extracted from the second database, and to obtain genre information extracted from a database having a higher priority as the genre information of the broadcast content when the genre information extracted from the first database differs from the genre information extracted from the second database.

The controller may be configured to obtain genre information of the broadcast content, stored in only one of the first and second databases, as the genre information of the broadcast content when the genre information of the broadcast content is stored in one of the first and second databases, and to apply default image quality when the genre information of the broadcast content is not stored in both the first and second databases.

Advantageous Effects

The broadcast receiving device according to the present invention can provide various types of broadcast-related information to users.

In addition, the broadcast receiving device according to the present invention can control image quality of a display unit on the basis of EPGs received through different networks.

Furthermore, the broadcast receiving device according to the present invention can control audio output characteristics of an audio output unit on the basis of EPGs received through different networks.

DESCRIPTION OF DRAWINGS

FIG. 2 is a flow chart illustrating an example of a method for driving a broadcast receiving device according to an embodiment of the present invention.

FIG. 3 is a view illustrating an example of related art EPG-based broadcast information and an example of broadcast-related information provided by the broadcast receiving device according to an embodiment of the present invention.

FIG. 6 is a view illustrating an example of information included in an air interface-based EPG and information include an Internet-based EPG according to each country.

FIG. 13 is a flowchart illustrating another example of a method for driving a broadcast receiving device according to an embodiment of the present invention.

FIG. 14 is a view illustrating an example illustrating a process of delivering broadcast-related information to an application based on EPG received via a heterogeneous network in a TV, a type of broadcast receiving device according to an embodiment of the present invention.

FIG. 16 illustrates examples of image quality control of the broadcast receiving device according to the present invention.

FIGS. 17 and 18 illustrate examples of controlling image quality in the broadcast receiving device according to the present invention.

BEST MODE

The aforementioned objects, features, and advantages of the present invention will become more apparent through the following detailed description with respect to the accompanying drawings. Hereinafter, the embodiments of the present invention will be described with reference to the accompanying drawings, in which like numbers refer to like elements throughout the specification.

Hereinafter, a broadcast receiving device related to the present invention will be described in detail with reference to the accompanying drawings. In the following description, usage of suffixes such as 'module', 'part', or 'unit' used for referring to elements is given merely to facilitate explanation of the present invention, without having any significant meaning by itself.

Figure 1:
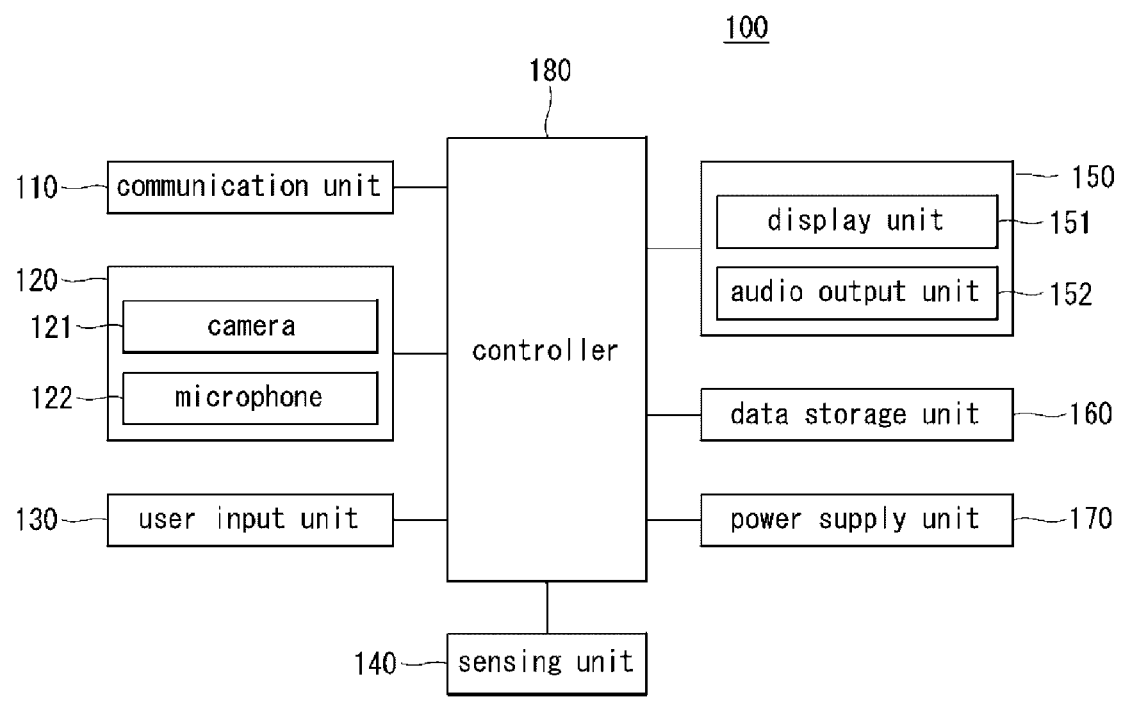
FIG. 1 is a view illustrating an example of a block diagram of a broadcast receiving device according to an embodiment of the present invention.

FIG. 1 is a block diagram of a broadcast receiving device 100 according to an embodiment of the present invention. The broadcast receiving device described in the present disclosure may include stationary electronic devices such as a TV, a PC, a digital signage device, and the like, and a mobile electronic device such as a smartphone, a smart pad, a notebook computer, and the like. However, the present invention is not limited thereto.

Referring to FIG. 1, the broadcast receiving device 100 includes a communication unit 110, an input unit 120, a user input unit 130, a sensing unit 140, an output unit 150, a data storage unit 160, a power supply unit 170, and a controller 180. The components illustrated in FIG. 1 are not a requirement, and the broadcast receiving device 100 may have more or less components. Hereinafter, each of the components will be described.

The communication unit 110 may include one or more modules allowing for wired/wireless communication between the broadcast receiving device 100 and a communication network. For example, the communication unit 110 may include a broadcast receiving module, a mobile communication module, a wired/wireless Internet module, a short-range communication module, and the like. The communication unit 110 may receive various data including a broadcast signal through a communication network.

The input unit 120 obtains an audio signal or a video signal from the outside. As illustrated in FIG. 1, the input unit 120 may include a camera 121, a microphone 122, or the like. The camera 121 processes an image frame of a still image, a video, or the like, obtained by an image sensor in a video call mode or an image capture mode. The microphone 122 receives an external audio signal and processes it into electrical voice data.

The user input unit 130 generates input data for controlling an operation of the broadcast receiving device 100 by a user. The user input unit 130 may include one or more of a keypad, a dome switch, a touch pad (e.g., a touch sensitive member that detects changes in resistance, pressure, capacitance, etc. due to being contacted), a jog wheel, a jog switch, and the like.

The sensing unit 140 may sense the current state of the broadcast receiving device 100 or sense a state of a user, and may sense a state of the surroundings of the broadcast receiving device 100. Data sensed by the sensing unit 140 may be used as a base for controlling an operation of the broadcast receiving device 100.

The output unit 150 may output an image signal and/or an audio signal of content reproduced under the control of the controller 180. As illustrated in FIG. 1, the output unit 150 may include a display unit 151 and an audio output unit 152.

The display unit 151 may display and output information processed in the broadcast receiving device 100. The display unit 151 may be formed as a liquid crystal display (LCD), a thin film transistor-LCD (TFT-LCD), an organic light emitting diode (OLED) display, or a flexible display. The display unit 151 may include a display outputting an image and a polarizing film filtering the image at a predetermined polarizing angle and outputting the same.

Also, the display unit 151 may output an image based on a polarized glass type or a shutter glass type to allow the user to recognize a three-dimensional (3D) stereoscopic image. However, the scheme for forming a 3D stereoscopic image is not limited to the foregoing examples.

The audio output unit 152 outputs an audio signal related to a function performed in the broadcast receiving device 100. The audio output unit 152 may include a receiver, a speaker, a buzzer, and the like. Also, the audio output unit 152 may output a sound through an earphone jack.

The data storage unit 160 may store a program for an operation of the controller 190, and may temporarily or permanently store input/output data. The data storage unit 160 may temporarily or permanently store image data output through the display unit 151 and audio data corresponding thereto.

The data storage unit 160 may store an operating system (OS) required for the broadcast receiving device 100 to operate and various application programs. The data storage unit 160 may temporarily store data generated during an operational process of the broadcast receiving device 100 or data received from the outside. Namely, the data storage unit 160 may include a nonvolatile data storage unit and a volatile data storage unit.

The data storage unit 160 may include implemented storage mediums such as a flash memory type, a hard disk type, a multimedia card micro type, a card type memory (e.g., SD, DX data storage unit, etc.), random access memory (RAM), a static random access memory (SRAM), a read-only memory (ROM), an electrically erasable programmable read-only memory (EEPROM), a programmable read-only memory (PROM), a magnetic data storage unit, a magnetic disk, an optical disk, and the like. Also, the broadcast receiving device 100 may operate in association with a web storage which performs the storage function of the data storage unit 160 on the Internet.

The controller 180 typically controls overall operation of the broadcast receiving device 100. Specifically, the controller 180 may control operations of the components of the broadcast receiving device 100. In one example, the controller 180 may control the display unit 151 and the audio output unit 152 to output an image and a sound based on broadcast data received through the communication unit 110. Also, the controller 180 may temporarily or permanently store various data generated during a broadcast data output process in the data storage unit 160.

The controller 180 may generate various broadcast-related information based on an electronic program guide (EPG) related to a broadcast received through the communication unit 110 and store the generated broadcast-related information in the data storage unit 160 or may provide the stored broadcast-related information for the user through the output unit 150. Here, the broadcast-related EPG may be received through a broadcast network or may be received through the Internet. The function of providing the broadcast-related information of the broadcast receiving device 100 will be described in detail hereinafter.

The controller 180 may include a plurality of lower control units respectively performing a specified function.

The power supply unit 170 may receive external and/or internal power to provide power required for operation of various components under the control of the controller 180.

Various embodiments described herein may be implemented in a computer or similar device readable recording medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Software codes can be implemented by a software application written in any suitable programming language. The software codes may be stored in the data storage unit 160 and executed by the controller 180.

FIG. 2 is a flow chart illustrating an example of a method for driving a broadcast receiving device according to an embodiment of the present invention. Hereinafter, the method for driving a broadcast receiving device will be described with reference to relevant drawings.

First, the communication unit 110 receives a broadcast signal including broadcast data and first broadcast-related EPG information from a broadcast network and receives second broadcast-related EPG information through the Internet (S100). The first EPG may be an EPG provided by a broadcasting station and the second EPG may be an EPG processed based on an EPG provided from a broadcasting station.

For example, the first EPG information may include only relatively simple, low-capacity information such as a program title, a program start and end time, a brief description of a program, and the like. Meanwhile, the second EPG information may include various types of information created by an EPG service provider based on the first EPG information. For example, the second EPG information may include an identifier identifying a program, a thumbnail image of a program, a detailed description of a program, relevant characters such as a director, an actor, or the like, of a program, genre information of a program, a brief video with respect to a program, and the like. However, the present invention is not limited thereto.

When the first and second EPGs are received, the controller 180 processes the first EPG to generate first broadcast-related information and processes the second EPG to generate second broadcast-related information (S110). Thereafter, the controller 180 makes the first and second broadcast-related information into DBs each having a different data structure, and stores the same in the data storage unit 160 (S120). Here, the first and second broadcast-related information may be stored in a portion of a nonvolatile storage unit of the data storage unit 160.

In a state in which the first and second broadcast-related information are stored in the data storage unit 160, a broadcast-related information request is received from an application being executed in the broadcast receiving device 100 (S130). Then, the controller 180 selectively searches a DB corresponding to at least one of the first and second broadcast-related information according to predetermined priorities (S140), and obtains the requested broadcast-related information based on the search result (S150).

Here, as for priorities of the first and second broadcast-related information, the first broadcast-related information may have a higher priority, the second broadcast-related information may have a higher priority, or the first and second broadcast-related information may have the same priority. When the first broadcast-related information has a higher priority, the controller 180 may search for only the DB corresponding to the first broadcast-related information (namely, the DB storing the first broadcast-related information) to obtain the requested broadcast-related information. On the contrary, when the priorities of the first and second broadcast-related information are equal, the controller 180 may search for all the DBs corresponding to the first and second broadcast-related information to obtain the requested broadcast-related information.

Meanwhile, the priorities of the first and second broadcast-related information may be determined in advance according to requested broadcast information or may be determined in advance according to applications which have requested broadcast-related information. Also, priorities of the first and second broadcast-related information may be determined in advance according to countries in which the broadcast receiving device 100 is being driven.

In another example, priorities of the first and second broadcast-related information may be determined in advance depending on whether the broadcast-related information requested by the application is included in the first and second broadcast-related information. For example, as for a thumbnail image relating to a program, broadcast-related information, that cannot be generated based on the first EPG received through a broadcast signal but can be generated based on a second EPG received through the Internet, a priority of the second broadcast-related information may be higher all the time. Namely, in a case in which particular broadcast-related information not included in the first broadcast-related information but included only in the second broadcast-related information is requested by an application, the controller 180 may search only the DB storing the second broadcast-related information to obtain the requested broadcast-related information.

When the requested broadcast-related information is obtained, the controller 180 delivers the obtained broadcast-related information to the application being executed (S160). Then, the application being executed may execute a predetermined operation using the received broadcast-related information.

For reference, in the present disclosure, for an EPG received through the broadcasting network, the first EPG and an air interface-based EPG will be used together, and for an EPG received through the Internet, the second EPG and an Internet-based EPG will be used together.

FIG. 3 is a view illustrating an example of related art EPG-based broadcast information and an example of broadcast-related information provided by the broadcast receiving device according to an embodiment of the present invention.

Referring to (a) of FIG. 3, it can be seen that the related art broadcast receiving device simply provides only channel information and program schedule information regarding each channel. Referring to (b) of FIG. 3, it can be seen that the broadcast receiving device 100 according to an embodiment of the present disclosure additionally provides an image corresponding to a program together with basic information regarding the program, genre information of the program, program-related character information, a summary of the program, and the like.

Although not shown, the broadcast receiving device 100 according to an embodiment of the present disclosure may basically provide program schedule information of each channel illustrated in (a) of FIG. 3. When a particular program is selected from the program schedule information of each channel, additional information regarding the selected program as illustrated in (b) of FIG. 3 may be provided.

Figure 4:
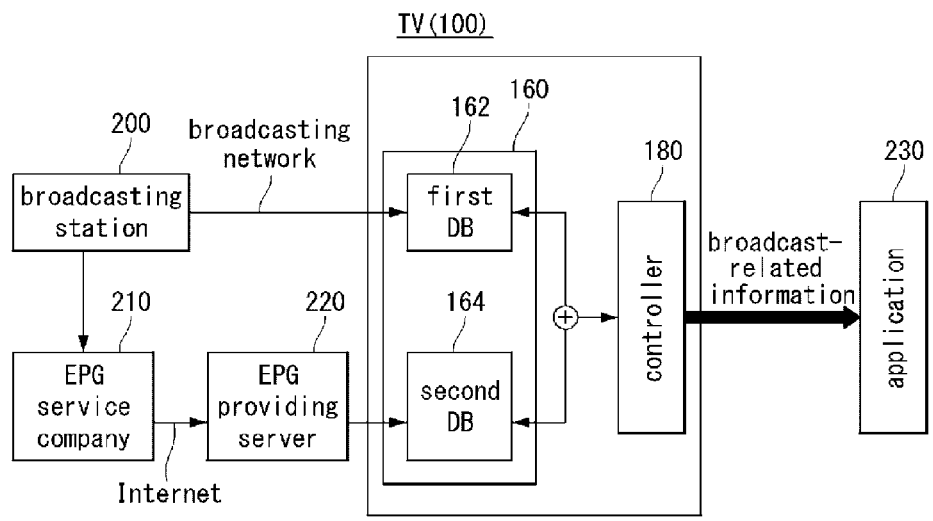
FIG. 4 is a view illustrating an example illustrating a process of delivering broadcast-related information to an application based on EPG received via a heterogeneous network in a TV, a type of broadcast receiving device according to an embodiment of the present invention.

FIG. 4 is a view illustrating an example illustrating a process of delivering broadcast-related information to an application based on EPG received via a heterogeneous network in a TV 100, a type of broadcast receiving device 100 according to an embodiment of the present invention. In FIG. 4, only components required for the processing of generating and delivering broadcast-related information among the components of the TV 100 are illustrated.

A broadcasting station 200 transmits a first EPG (a basic EPG provided by the broadcasting station) through a broadcasting network. Then, the TV 100 receives the first EPG and stores the received first EPG in a first DB 162 of the data storage unit 160. Although not shown, the TV 100 may process the received first EPG to have a predetermined data structure and store the same.

The first EPG is delivered to an EPG service provider 210 which, upon receiving the first EPG, processes the first EPG and provides the same. The EPG service provider 210 generates a second EPG with various types of broadcast-related information added thereto based on the first EPG and stores the generated second EPG in an EPG providing server 220. The second EPG may further include a thumbnail image, a video image, a summary, cast, a genre, and the like, of a broadcasting program.

The second EPG stored in the EPG providing server 200 is stored in a second DB 164 of the data storage unit 160 of the TV 100. Although not shown, the TV may process the received second EPG to have a predetermined data structure and store the same. Namely, the TV 100 may separately store, manage, and use data based on the first EPG received through the broadcasting network and data of the second EPG-based received through the Internet.

Countries providing an EPG providing service through an EPG service provider include, Republic of Korea, the United States, the United Kingdom, France, Germany, Spain, and the like, and many other countries are expected to provide such a service in the future.

In response to the broadcast-related information request from the application, the controller 180 may selectively search the first DB 162 and the second DB 164 and obtain requested broadcast-related information based on the search result. For example, when a basic broadcast program schedule is requested, the controller 180 may search the first DB 162 based on the first EPG having higher reliability and obtain a basic broadcast program schedule. However, when a video related to a broadcast program having large data capacity is requested, the controller 180 may search the second DB 164 based on the second EPG including various types of information and obtain a video related to a broadcast program.

Namely, in the broadcast receiving device 100, at least one of the first DB 162 and the second DB 164 may be a subject to be searched relating to requested broadcast-related information according to types of broadcast-related information requested by the application 2230 being executed.

Figure 5:
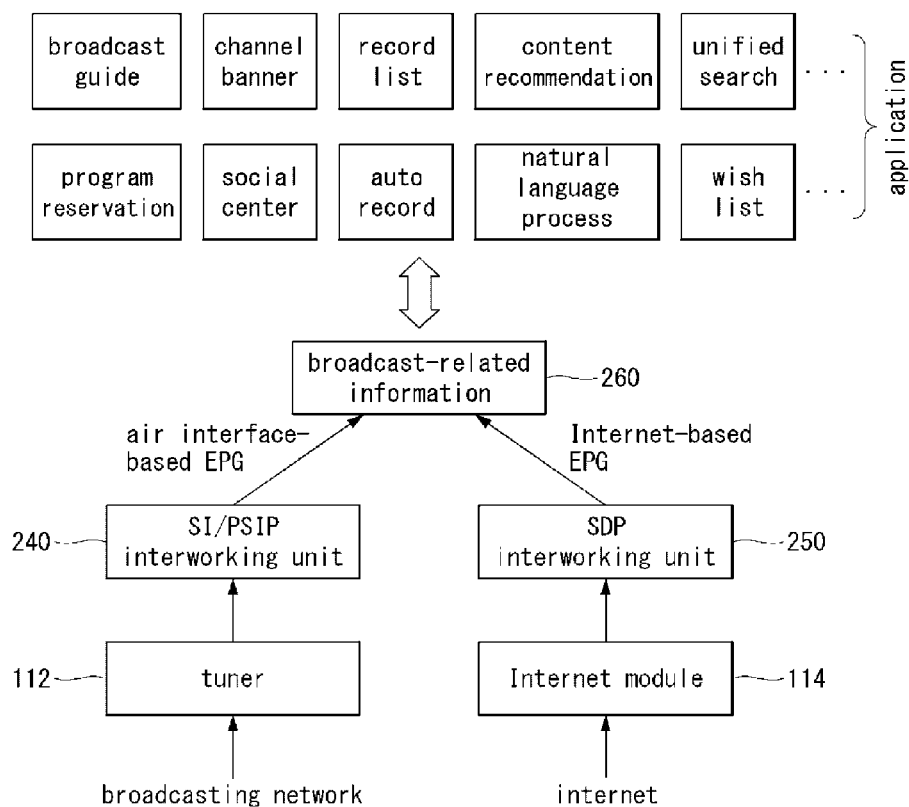
FIG. 5 is a view illustrating an example conceptually illustrating a process of providing broadcast-related information in the broadcast receiving device according to an embodiment of the present invention.

FIG. 5 is a view illustrating an example conceptually illustrating a process of providing broadcast-related information in the broadcast receiving device 100 according to an embodiment of the present invention.

A tuner 112 receives a broadcast signal including a service information (SI)/program & system information protocol (PSIP)-based broadcast information through a broadcasting network. The tuner 112 is part of a broadcast receiving module of the communication unit 110. The other components of the broadcast receiving module are omitted for the purposes of description. SI is a protocol for transmitting broadcast information aggregated through a predetermined classification, and PSIP is a protocol for transmitting information regarding a broadcast program based on an advanced television system committee (ATSC) standard.

An SI/PSIP interworking unit 240 extracts an EPG from a broadcast signal received through the tuner 112 and outputs the extracted EPG to a broadcast-related information providing unit 260. The EPG information extracted from the broadcast signal is referred to as an "air interface-based EPG" in FIG. 5. The SI/PSIP interworking unit 240 may also be part of the broadcast receiving module.

The Internet module 114 receives a signal including broadcast-related data from the Internet. In this case, the Internet module 114 serves as a service delivery platform and receives data. Here, the SDP interworking unit 250 extracts the EPG from the received signal and outputs the extracted EPG to the broadcast-related information providing unit 260. The extracted EPG information is referred to as an "Internet-based EPG" in FIG. 5. The SDP interworking unit 250 may form a part of an Internet module.

When the air interface-based EPG and the Internet-based EPG are received, the broadcast-related information providing unit 260 may process the received EPGs to generate broadcast-related information and make the broadcast-related information into DB and store the same, or may merge and analyze the two EPGs and make the same into a DB having a single data structure and store the same.

After the generated broadcast-related information is stored, when a broadcast-related information request is received from an application, the broadcast-related information providing unit 260 may search the DB to obtain the requested broadcast-related information. For reference, the broadcast-related information providing unit 260 may be a conceptual block comprehensively executing functions of the controller 180, the data storage unit 160, and the like, as described above.

The application that requests the broadcast-related information from the broadcast-related information providing unit 260 may include a broadcast guide, viewing reservation, a channel banner, a social center, and the like. The broadcast-related information requested by the application may be extracted from an air interface-based EPG or may be extracted from an Internet-based EPG.

Meanwhile, which of the air interface-based EPG and the Internet-based EPG has better quality may vary depending on countries. However, in general, air interface-based EPG has reliability higher than that of the Internet-based EPG. The reason for this is because the air interface-based EPG is directly provided by a reputable broadcasting station, while the Internet-based EPG is generated by an EPG service provider based on an air interface-based EPG.

However, in terms of quantity of provided information, the Internet-based EPG is superior to the air interface-based EPG in many cases. This is because capacity allocated to the Internet-based EPG is greater than that allocated to the air interface-based EPG. Thus, the Internet-based EPG may include larger data such as a program thumbnail image, a program-related video, and the like, not provided by the air interface-based EPG.

FIG. 6 is a view illustrating an example of information included in an air interface-based EPG and information include an Internet-based EPG according to each country.

The fact that the amount of information included the Internet-based EPG is greater than the amount of information included in the air interface-based EPG is common to every country. In a typical example, it can be seen that the Internet-based EPG of each country includes a thumbnail image with respect to a program having large data capacity. Also, it can be seen that the Internet-based EPG further includes various types of information such as an episode, an actor, a director, and the like, of a program not included in the air interface-based EPG. A salient point of the Internet-based EPG includes a program ID, unlike the air interface-based EPG. The program ID may be used for removing duplicated program information, collecting ratings, and the like. Also, it can be seen that the air interface-based EPG of the United States has very low coverage.

As discussed above with reference to FIG. 6, Information included in the air interface-based EPG and the Internet-based EPG may vary depending on countries. Thus, the broadcast receiving device 100 according to an embodiment of the present invention may determine whether to search a DB generated based on the air interface-based EPG, whether to search a DB generated based on the Internet-based EPG, or whether to search both in order to obtain a broadcast-related signal requested by an application. Namely, a search priority with respect to DBs for obtaining broadcast-related information requested by an application may vary depending on the country in which the broadcast receiving device 100 is driven.

Meanwhile, with respect to broadcast information which is included in broadcast-related information generated based on the Internet-based EPG but not included in broadcast-related information generated based on the air interface-based EPG, the broadcast receiving device 100 may provide a higher priority to broadcast-related information generated based on the Internet-based EPG regardless of a predetermined search priority.

For example, in a case in which a thumbnail image with respect to a particular program included only in the Internet-based EPG is requested by an application, the broadcast receiving device 100 may search for only broadcast-related information generated based on the Internet-based EPG and obtain the requested thumbnail image.

Figure 7:
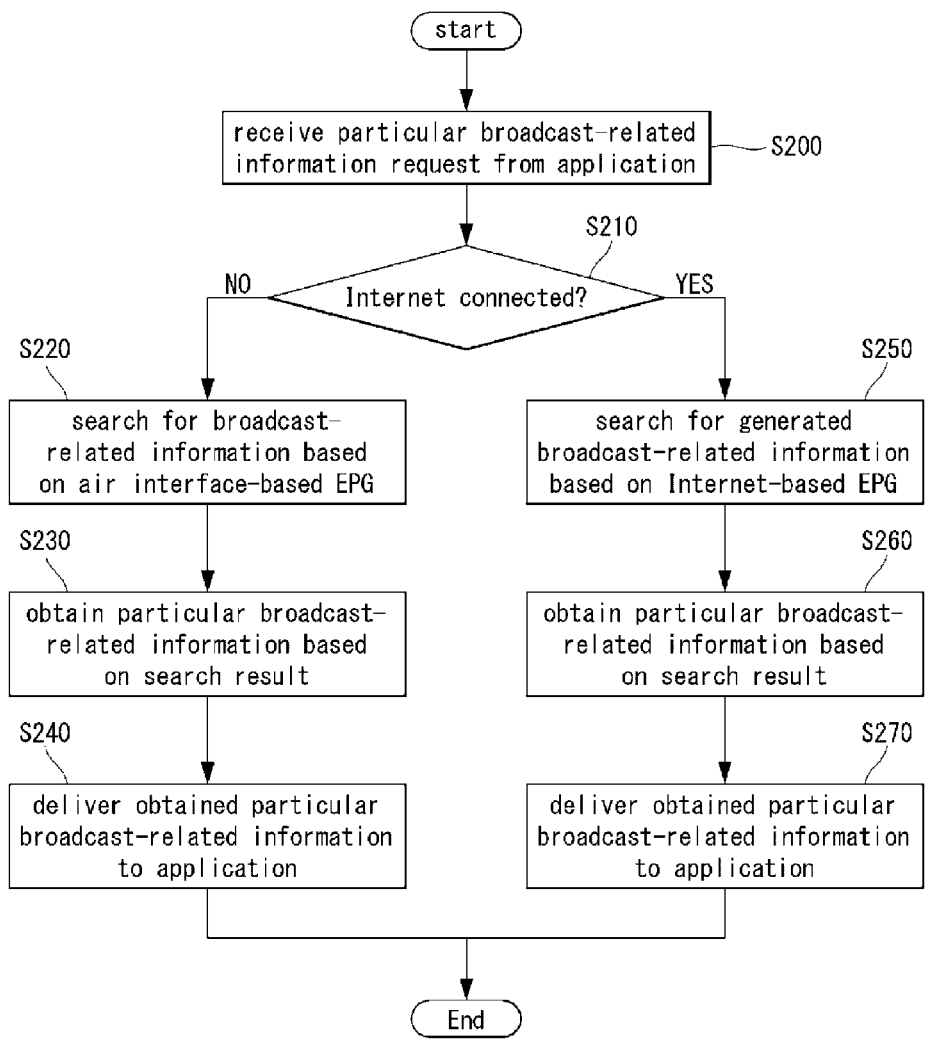
FIG. 7 is a flow chart illustrating another example of a method for driving a broadcast receiving device according to an embodiment of the present invention.

FIG. 7 is a flow chart illustrating another example of a method for driving a broadcast receiving device according to an embodiment of the present invention. Hereinafter, the method for driving a broadcast receiving device will be described with reference to the relevant drawings.

A particular broadcast-related information request is received from an application (S200). Then, the controller 180 of the broadcast receiving device 100 determines whether the broadcast receiving device 100 is connected to the Internet (S210).

When the broadcast receiving device 100 is not connected to the Internet, the controller 180 searches for broadcast-related information based on the air interface-based EPG (S220), obtains particular broadcast-related information based on the search result (S230), and delivers the obtained particular broadcast-related information to the application (S240).

However, when the broadcast receiving device 100 is connected to the Internet, the controller 180 searches for broadcast-related information generated based on the Internet-based EPG (S250), obtains particular broadcast-related information based on the search result (S260), and delivers the obtained particular broadcast-related information to the application (S270).

Namely, the broadcast receiving device according to an embodiment of the present invention may vary a search range for obtaining broadcast-related information based on a connection state of the Internet.

Figure 8:
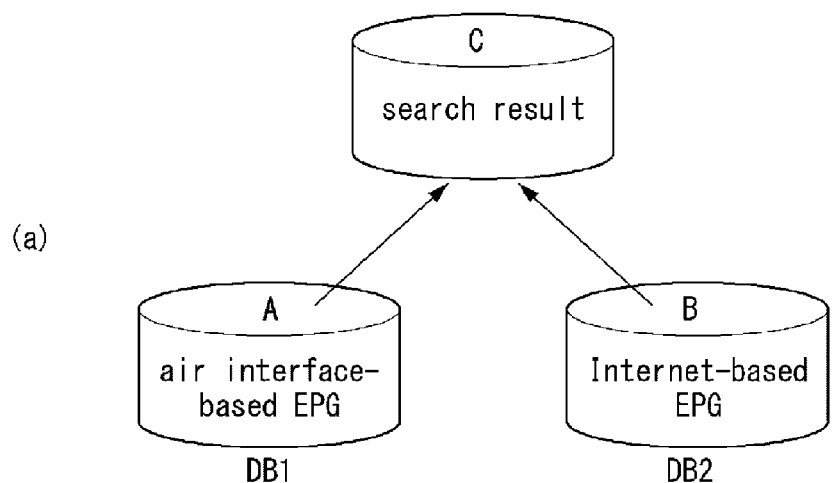
FIG. 8 is a view conceptually illustrating the exemplary method for driving the broadcast receiving device of FIG. 7.

FIG. 8 is a view conceptually illustrating the exemplary method for driving the broadcast receiving device of FIG. 7.

In FIG. 8, based on a particular broadcast-related information request from an application, a search result obtained from an air interface-based EPG DB (DB1) is designated as A, a search result obtained from the Internet-based EPG DB (DB2) is designated as B, and a search result finally obtained by the controller 180 is C.

Referring to (b) of FIG. 8, in the Republic of Korean, it can be seen that, when the Internet is not connected, a final search result by the controller 180 may be a search result from the air interface-based EPG DB, while when the Internet is connected, a final search result by the controller 180 is a search result from the Internet-based EPG DB.

Meanwhile, in Europe, it can be seen that when the when the Internet is not connected, a final search result by the controller 180 may be a search result from the air interface-based EPG DB, while when the Internet is connected, a final search result by the controller 180 is a combination of a search result from the air interface-based EPG DB and a search result from the Internet-based EPG DB.

When the search results from the two DBs are not identical, the controller 180 may select one among the search result from the air interface-based EPG DB and the search result from the Internet-based EPG DB based on a reliability priority previously determined for the particular broadcast-related information. The predetermined reliability priority may differ depending on the particular broadcast-related information or may differ depending on a country in which the broadcast receiving device 100 is driven.

Namely, the broadcast receiving device 100 according to an embodiment of the present invention may obtain the particular broadcast-related information requested by the application by merging and analyzing the search result from the air interface-based EPG DB and the search result from the Internet-based EPG DB.

Figure 9:
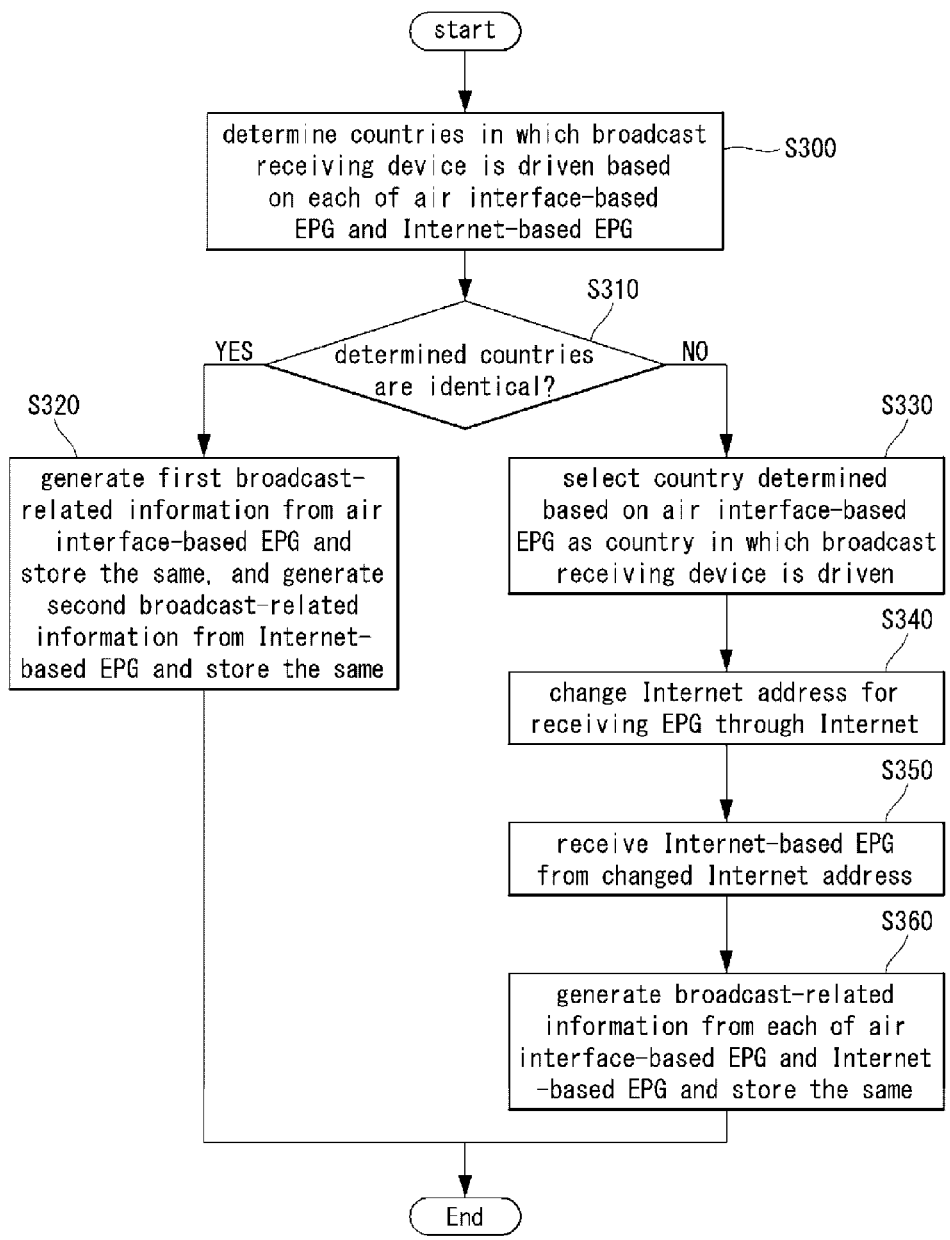
FIG. 9 is a flow chart illustrating another example of a method for driving a broadcast receiving device according to an embodiment of the present invention.

FIG. 9 is a flow chart illustrating another example of a method for driving a broadcast receiving device according to an embodiment of the present invention. Hereinafter, the method for driving a broadcast receiving device will be described with reference to the relevant drawings.

When an air interface-based EPG and an Internet-based EPG are received through the communication unit 110, the controller 180 determines countries in which the broadcast receiving device 100 is driven, based on each of the received EPGs (S300). Thereafter, the controller 180 determines whether the countries determined based on the two EPGs are identical (S310).

When the two countries determined in step S310 are identical, the controller 180 generates broadcast-related information from the air interface-based EPG and stores the same, and generates broadcast-related information from the Internet-based EPG and stores the same (S320). The broadcast-related information generated from the two EPGs may be made into DBs having different data structures and stored or may be merged to form a DB having a single data structure and stored.

However, when the two countries determined in step S310 are different, the controller 180 selects the country determined based on the air interface-based EPG, as a country in which the broadcast receiving device 100 is driven (S330). The reason is because the country determined based on information included in a received broadcast signal has a higher probability of being a country in which the broadcast receiving device 100 is driven in actuality.

Thereafter, the controller 180 changes an Internet address for receiving the EPG through the Internet into predetermined other network address corresponding to the country determined based on the air interface-based EPG (S340). The controller 180 receives a new Internet-based EPG from the changed Internet address (S350).

Thereafter, the controller 180 generates broadcast-related information from the air interface-based EPG and stores the same, and generates broadcast-related information from the Internet-based EPG received from the changed Internet address and stores the same (S360).

As discussed above, the broadcast receiving device 100 according to an embodiment of the present invention may automatically determine a country in which the broadcast receiving device 100 is actually driven or perform a correction function, and may receive an Internet-based EPG or receive a new Internet-based EPG.

Figure 10:
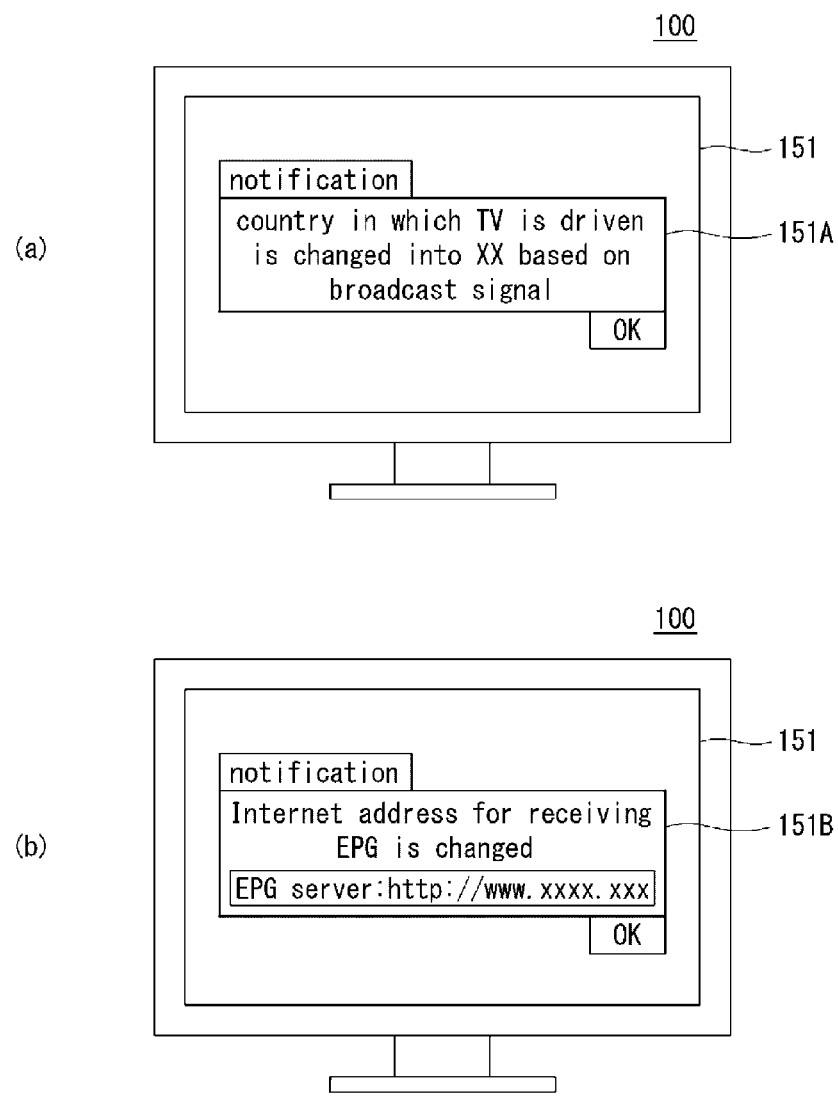
FIG. 10 is a view illustrating various examples of a graphic user interface provided by the broadcast receiving device according to an embodiment of the present invention according to the method for driving a broadcast receiving device illustrated in FIG. 9.

FIG. 10 is a view illustrating various examples of a graphic user interface provided by the broadcast receiving device according to an embodiment of the present invention according to the method for driving a broadcast receiving device illustrated in FIG. 9.

Referring to (a) of FIG. 10, it can be seen that, when a country in which the broadcast receiving device 100 is driven is changed based on the air interface-based EPG, the broadcast receiving device 100 displays a corresponding graphic user interface (GUI) 151A. Although not shown, the broadcast receiving device 100 may provide a GUI for selecting a country in which the broadcast receiving device 100 to be driven.

Referring to (b) of FIG. 10, it can be seen that, when a country in which the broadcast receiving device 100 is driven is changed based on the air interface-based EPG, the broadcast receiving device 100 may set a new Internet address for receiving the Internet-based EPG and displays a corresponding GUI 151B on the display unit 151. Meanwhile, although not shown, the broadcast receiving device 100 may provide a GUI for inputting a new Internet address for receiving the Internet-based EPG or a GUI for selecting a new Internet address.

Figure 11:
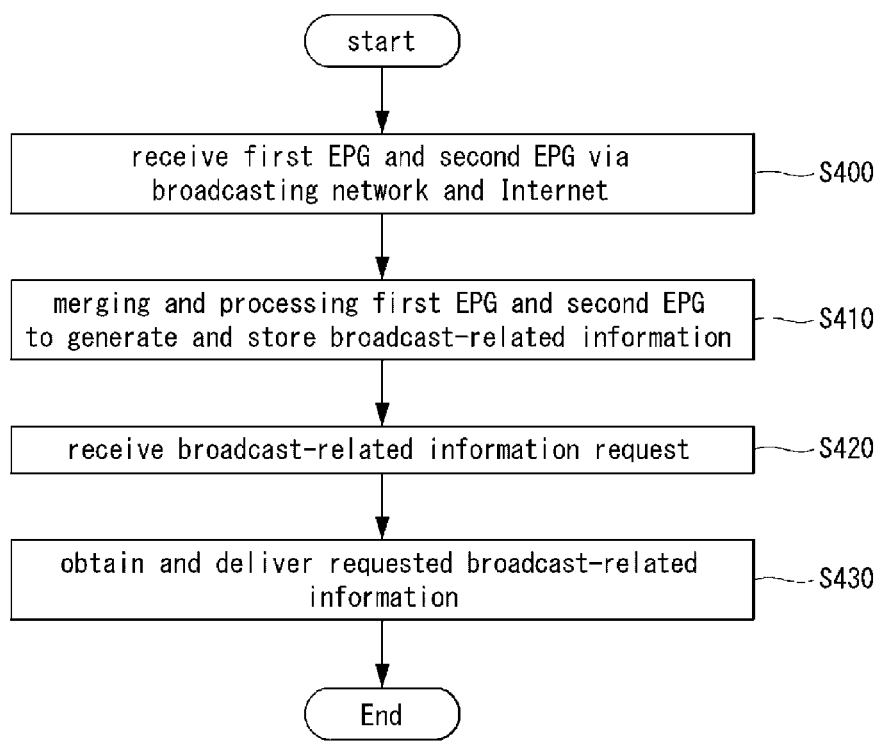
FIG. 11 is a flow chart illustrating another example of a method for driving a broadcast receiving device according to an embodiment of the present invention.

FIG. 11 is a flow chart illustrating another example of a method for driving a broadcast receiving device according to an embodiment of the present invention. Hereinafter, the method for driving a broadcast receiving device will be described with reference to the relevant drawings.

A first EPG is received through a broadcasting network and a second EPG is received through the Internet (S400). Then, the controller 180 merges and processes the first and second EPGs to generate broadcast-related information and stores the same in the data storage unit 160 (S410).

Here, the controller 180 may determine a predetermined priority for each of the first and second EPGs. For example, in case of particular data which is not included in any one of the first and second EPGs but included in the other remaining one, the controller 180 may store the particular data as the broadcast-related information regardless of the predetermined priority. In a specific example, in case of a thumbnail image with respect to a program generally not included in the first EPG, the controller 180 may store the thumbnail image included in the second EPG as broadcast-related information regardless of the predetermined priority.

In another example, in a case in which data included in the first EPG and data included in the second EPG collide, the controller 180 may generate broadcast-related information based on the data included in an EPG selected from among the first and second EPGs according to the given priority. In a specific example, with respect to a broadcast schedule for each channel, the controller 180 may give a higher priority to the data included in the first EPG. The reason for this is because, in general, reliability of the first EPG is higher than that of the second EPG.

Figure 12:
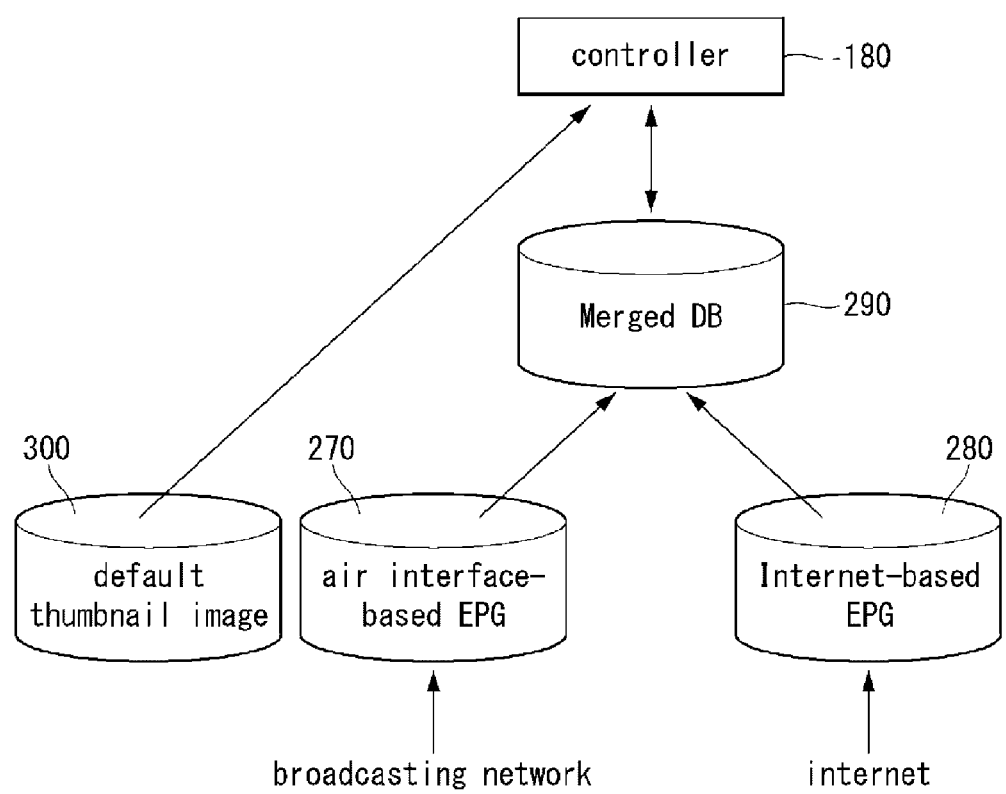
FIG. 12 is a view conceptually illustrating an example of requested broadcast-related information according to the method for driving a broadcast receiving device illustrated in FIG. 11.

FIG. 12 is a view conceptually illustrating an example of requested broadcast-related information according to the method for driving a broadcast receiving device illustrated in FIG. 11.

Referring to FIG. 12, it can be seen that the controller 180 merges and analyzes the air interface-based EPG 270 and the Internet-based EPG 280 to construct a merged DB 290. A reference for merging and analyzing the air interface-based EPG 270 and the Internet-based EPG 280 has been described above with reference to FIG. 11, so an example of establishing a schedule list for each channel will be described as a specific example thereof.

The controller 180 generates a channel list based on the air interface-based EPG. This is because reliability of the air interface-based EPG is higher than the Internet-based EPG and a possibility of omitting a channel list in the air interface-based EPG is extremely low. The controller 180 may also generate a schedule list of each channel based on the air interface-based EPG. However, in case of a schedule list which is absent in the air interface-based EPG but present in the Internet-based EPG, the Internet-based EPG may be used. The controller 180 may basically use the air interface-based EPG to generate program information included in a schedule of each channel, and may add information present only in the Internet-based EPG.

In FIG. 12, it can be seen that a default thumbnail image 300 may be used by the controller 180, apart from the air interface-based EPG and the Internet-based EPG. The default thumbnail image 300 may be a thumbnail image related to each program genre not included in the first EPG. In a case in which the Internet is not connected, the controller 180 may associate the thumbnail image of each of the previously stored program genres with broadcast-related information generated based on the first EPG and provide the same.

In FIG. 12, a thumbnail image of each genre is taken as an example of information for complementing the broadcast-related information based on the first EPG, but the present invention is not limited thereto. Namely, the broadcast receiving device 100 according to an embodiment of the present invention may be used to complement the broadcast-related information based on the first EPG, while separately managing information of a particular category not included in the first EPG.

FIG. 13 is a flowchart illustrating another example of a method for driving a broadcast receiving device according to an embodiment of the present invention. Hereinafter, the method for driving a broadcast receiving device will be described with reference to the relevant drawings.

The communication unit 110 receives a broadcast signal including broadcast data and first broadcast-related EPG information from a broadcast network and receives second broadcast-related EPG information through the Internet (S500). The first EPG may be an EPG provided by a broadcasting station and the second EPG may be an EPG processed on the basis of EPGs provided by a broadcasting station.

When the first EPG and the second EPG are received, the controller 180 generates first broadcast-related information by processing the first EPG (air interface-based EPG), makes the first broadcast-related information into a first database and stores the same in the data storage unit 160. In addition, the controller 180 generates second broadcast-related information by processing the second EPG (Internet based EPG), makes the second broadcast-related information into a second database and stores the same in the data storage unit 160 (S510).

That is, the broadcast receiving device 100 according to the present invention can respectively manage the broadcast network and the Internet. It is desirable that the first broadcast-related information and the second broadcast-related information be stored in a portion of a non-volatile storage means of the data storage unit 160. The broadcast-related information may include various types of information, such as channel information of broadcast content, genre information of broadcast content, broadcast content related thumbnail images, and broadcast content start time and end time. However, the present invention is not limited thereto.

The controller 180 obtains genre information of currently output broadcast content on the basis of the first and second databases (S520). Here, the controller 180 can obtain the genre information of the broadcast content by selectively searching the first and second databases. Priorities may be predetermined for the first and second databases. For example, the controller 180 can search only the first database, search only the second database or search both the first and second databases according to the predetermined priorities.

Upon acquisition of the genre information of the broadcast content, the controller 180 may control the display unit 151 to realize image quality corresponding to the obtained genre information of the broadcast content (S530). The data storage unit 160 may store image quality information per genre in the first and second databases, and the controller 180 can achieve image quality corresponding to the genre information of the broadcast content with reference to the first and second databases. Here, image quality factors controlled by the controller 180 may include color temperature, contrast, saturation, color, sharpness, gamma control and the like. However, the present invention is not limited thereto.

FIG. 14 is a view illustrating an example illustrating a process of delivering broadcast-related information to an application based on EPG received via a heterogeneous network in a TV 100, a type of broadcast receiving device 100 according to an embodiment of the present invention. In FIG. 14, only components required for the processing of generating and delivering broadcast-related information among the components of the TV 100 are illustrated.

A broadcasting station 200 transmits a first EPG (a basic EPG provided by the broadcasting station) through a broadcasting network. Then, the TV 100 receives the first EPG and stores the received first EPG in a first DB 162 of the data storage unit 160. Although not shown, the TV 100 may process the received first EPG to have a predetermined data structure and store the same.

The first EPG is delivered to an EPG service provider 210 which, upon receiving the first EPG, processes the first EPG and provides the same. The EPG service provider 210 generates a second EPG with various types of broadcast-related information added thereto based on the first EPG and stores the generated second EPG in an EPG providing server 220. The second EPG may further include a thumbnail image, a video image, a summary, cast, a genre, and the like, of a broadcasting program. The EPG service provider 210 may generate the second EPG using data independent of an EPG received from the broadcasting station as necessary.

The second EPG stored in the EPG providing server 200 is stored in a second DB 164 of the data storage unit 160 of the TV 100.

The controller 180 searches the first database 162 and the second database 164 to obtain genre information of broadcast content being output. Thereafter, the controller 180 generates an image quality control signal on the basis of the acquired genre information. Subsequently, the controller 180 transmits the image quality control signal to the display unit 151. The display unit 151 realizes image quality corresponding to the broadcast content on the basis of the image quality control signal.

An example of generating the image quality control signal by the controller 180 will now be described. The data storage unit 160 may store information on image quality optimized per broadcast content genre or information on image quality set by the user per broadcast content genre.

The controller 180 obtains genre information of broadcast content being output on the basis of the first and second databases 162 and 164 and acquires information on image quality corresponding to the obtained genre information and prestored in the data storage unit 160.

Thereafter, the controller 180 can generate an image quality control signal for controlling image quality realized by the display unit 151 on the basis of the obtained image quality information. Here, image quality factors controlled by the image quality control signal may include contrast, color, saturation, color temperature, sharpness, etc. However, the present invention is not limited thereto.

Figure 15:
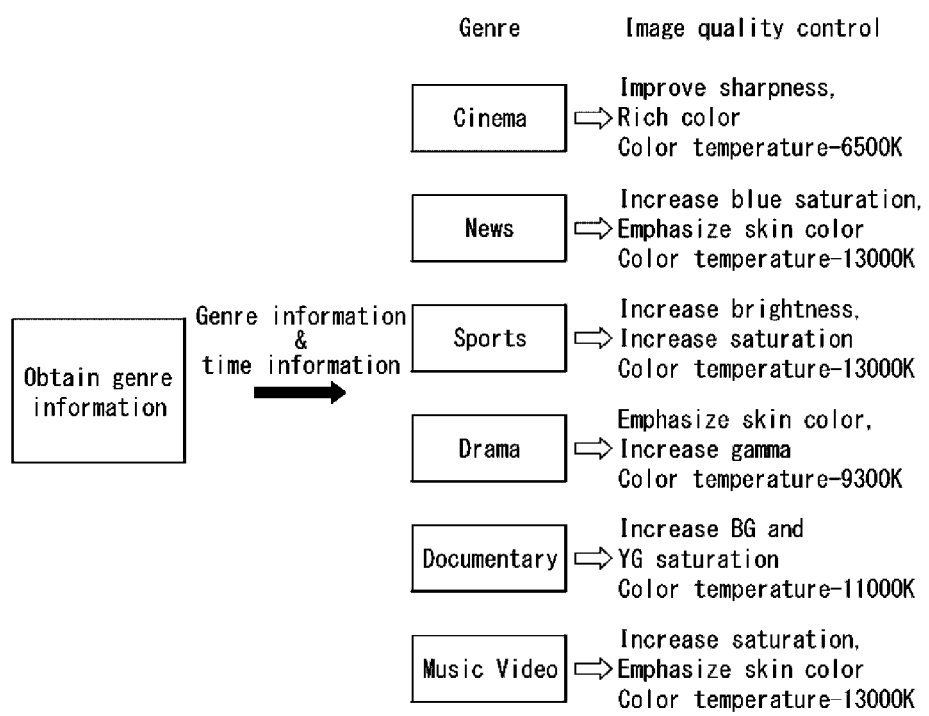
FIG. 15 illustrates an example of controlling image quality according to a broadcast content genre in the broadcast receiving device according to the present invention.

FIG. 15 illustrates an example of controlling image quality on the basis of a broadcast content genre in the broadcast receiving device 100 according to the present invention.

The controller 180 obtains genre information and time information of broadcast content on the basis of the first and second databases and controls image quality realized by the display unit 151. When the broadcast content is a movie, the controller 180 can control image quality such that sharpness is improved and colors become rich and, simultaneously, adjust color temperature to 6500K. When the broadcast content is a news program, the controller 180 can increase saturation of blue, emphasize skin colors and, simultaneously, adjust color temperature to 13000K.

When the broadcast content is a sports program, the controller 180 can increase brightness and saturation and, simultaneously, adjust color temperature to 13000K. When the broadcast content is a drama, the controller 180 can emphasize skin colors, increase gamma and, simultaneously, adjust color temperature to 9300K. When the broadcast content is a documentary, the controller 180 can increase saturation and adjust color temperature to 11000K. When the broadcast content is a music video, the controller 180 can increase saturation, emphasize skin colors and, simultaneously adjust color temperature to 13000K.

Image quality control related data per broadcast content may be prestored in the data storage unit 160. Image quality control per broadcast content genre is not limited to the aforementioned examples.

FIG. 16 illustrates examples of image quality control of the broadcast receiving device 100 according to the present invention.

Referring to FIG. 16(a), the controller 180 of the broadcast receiving device 100 can linearly increase a specific image quality factor to a target value. The controller 180 may linearly decrease a specific image quality factor to a target value and non-linearly increase/decrease a specific image quality factor.

Referring to FIG. 16(b), the controller 180 can increase a specific image quality factor to a target value in stages. The controller 180 may decrease a specific image quality factor to a target value in stages.

The aforementioned image quality control method controls image quality realized by the display unit 151 according to genre information of broadcast content and reduces visual discomfort of a viewer by limiting image quality variation with time.

Figure 17:
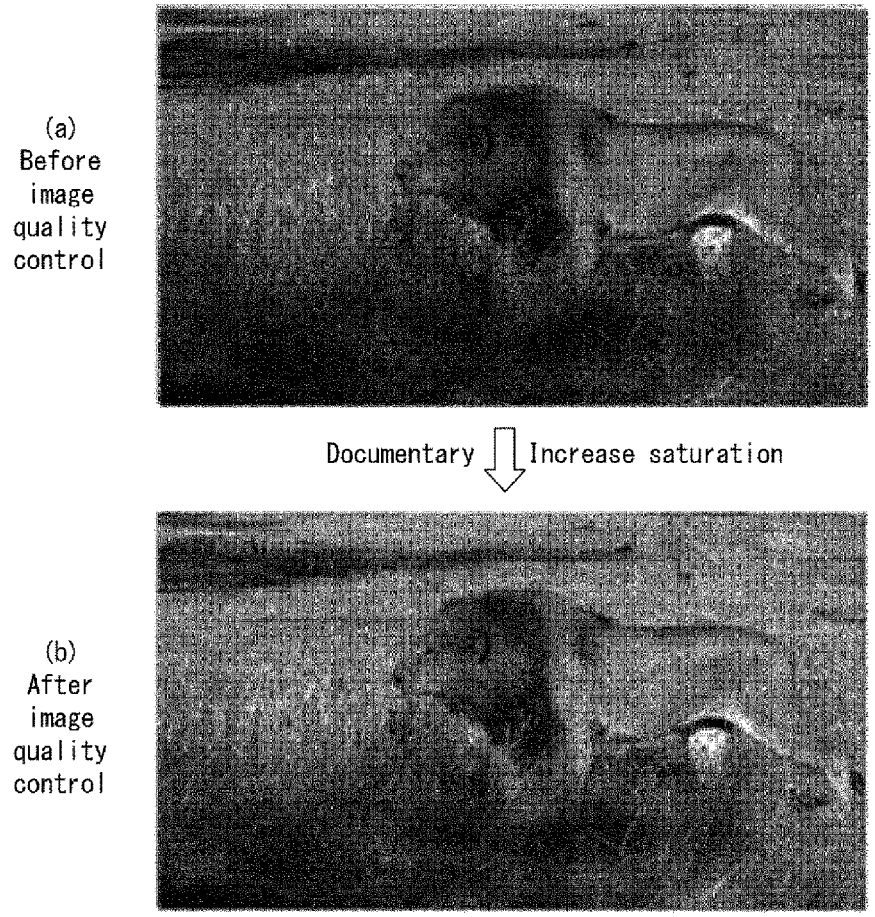

FIGS. 17 and 18 illustrate examples of controlling image quality in the broadcast receiving device 100 according to the present invention.

Referring to FIG. 17, when broadcast content being output through the broadcast receiving device 100 is a documentary, the controller 180 can display a more distinct image by emphasizing saturation. Referring to FIG. 18, when the broadcast content is a drama, the controller 180 can display a soft image by emphasizing skin colors.

Figure 19:
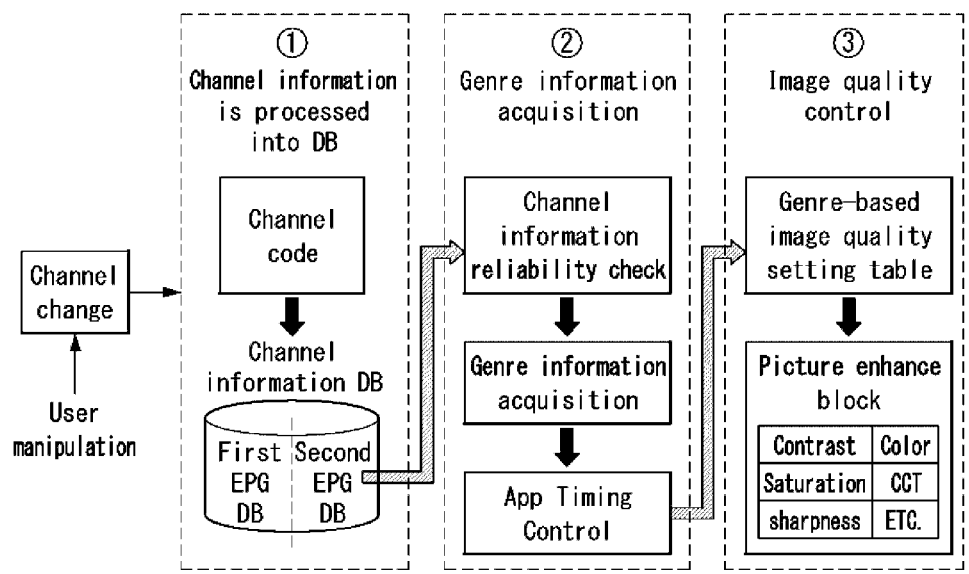
FIG. 19 illustrates an example of a process of controlling image quality in the broadcast receiving device according to the present invention.

FIG. 19 illustrates an example of a procedure of controlling image quality in the broadcast receiving device 100 according to the present invention.

The aforementioned process may be performed in the order of storage of channel information as a database, acquisition of genre information and image quality control. In the process of storing channel information as a database, broadcast-related information is generated on the basis of air interface-based EPGs and stored in a first EPG database and broadcast-related information is generated on the basis of Internet-based EPGs and stored in a second EPG database. FIG. 19 shows a channel information database obtained by merging the first and second databases. Time-based broadcast information of the corresponding channel is stored in the channel information database.

In this state, the channel is switched according to user manipulation. Then, the controller 180 compares a switched channel code with a channel code of the channel information database and obtains genre information on the basis of the comparison result.

In the process of obtaining genre information, the controller 180 checks channel information reliability. Specifically, the controller 180 may compare information related to broadcast content being broadcast over the switched channel and stored in the first and second EPG databases to determine whether the two pieces of information are identical. More specifically, the controller 180 may determine whether the two pieces of information are identical by comparing dates, times and broadcast content titles extracted from the two databases.

When the pieces of information extracted from the two databases differ from each other, the controller 180 may give priority to air interface reception-based data stored in the first EPG database or Internet reception-based data stored in the second EPG database. If the pieces of information extracted from the two databases are identical, the controller 180 may assign the same priority to the two databases.

Figure 20:
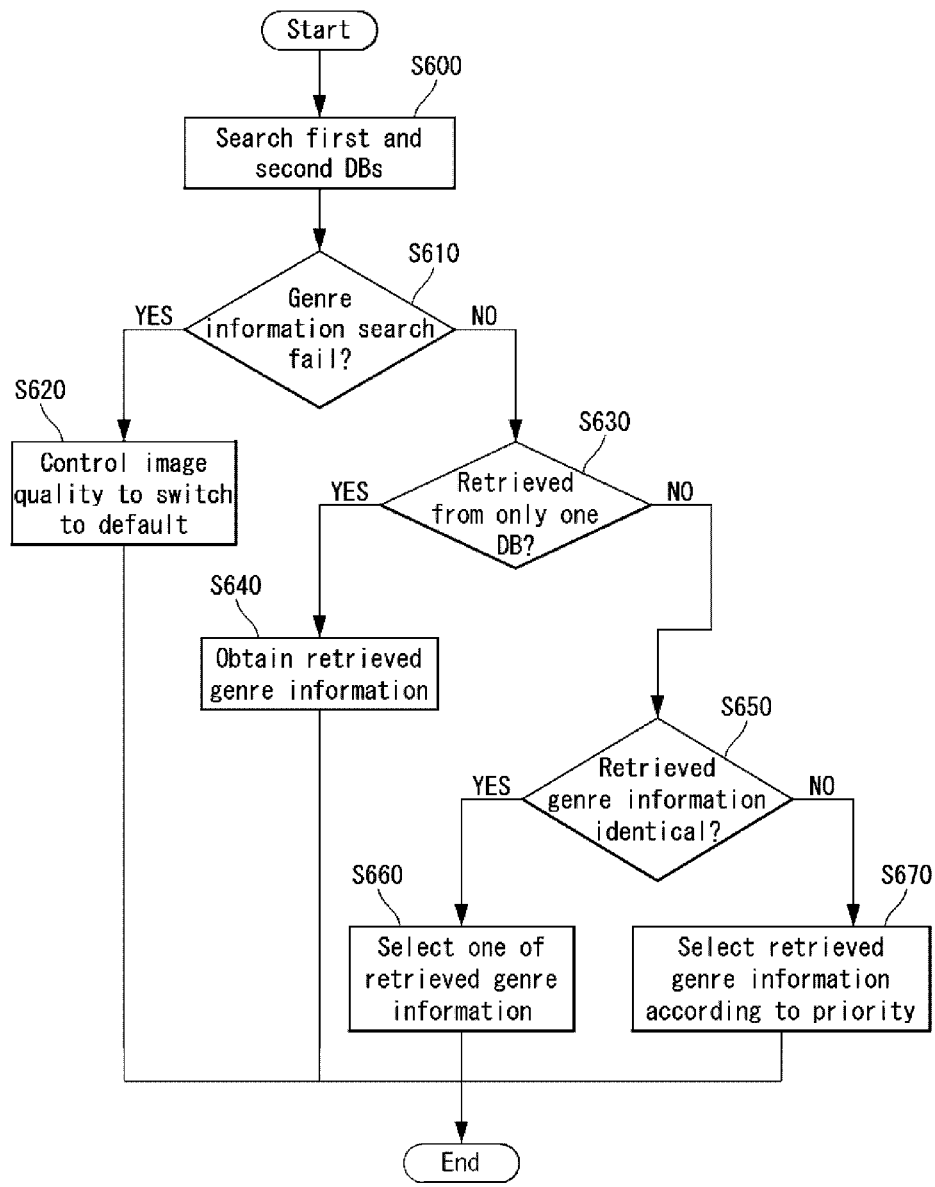
FIG. 20 is a flowchart illustrating an example of a method for acquiring genre information of broadcast content in the broadcast receiving device according to the present invention.

A description will be given of a method of obtaining genre information of the broadcast content by the controller 180 with reference to FIG. 20. FIG. 20 is a flowchart illustrating an exemplary method of obtaining genre information of broadcast content in the broadcast receiving device 100 according to the present invention. Hereinafter, the method for obtaining genre information will be described with reference to the relevant drawings.

The controller 180 searches the first database in which broadcast-related information on the basis of air interface-based EPGs is stored and the second database in which broadcast related-information on the basis of Internet-based EPGs is stored (S600) and determines whether genre information of broadcast content is not retrieved from the two databases (S610).

When the genre information of the broadcast content is not retrieved from the two databases (YES), the controller 180 controls image quality realized by the display unit 151 to be switched to default image quality (S620). The default image quality may correspond to the standard video mode of the broadcast receiving device 100.

When the genre information of the broadcast content is retrieved from the first and second databases (NO), the controller 180 determines whether the genre information is retrieved from only one of the first and second databases (S630). When the genre information is retrieved from only one of the first and second databases (YES), the controller 180 obtains the genre information retrieved from the corresponding database as the genre information of the broadcast content (S640).

When the genre information is retrieved from both the first and second databases (NO), the controller 180 determines whether the retrieved pieces of genre information are identical (S650). If the retrieved pieces of information are identical (YES), the controller 180 selects one of the retrieved information (S660). When the retrieved pieces of information are not identical (NO), the controller 180 selects one of the retrieved information according to predetermined priority (S670).

Referring back to FIG. 19, the controller 180 determines whether a viewer has fixed the channel upon acquisition of the genre information of the broadcast content. This corresponds to an App timing control process in FIG. 19. More specifically, the controller 180 can deliver an image quality control signal to the display unit 151 only after a predetermined lapse of time from channel switch. This is because controlling image quality to correspond to the broadcast content when the channel is not fixed is meaningless.

Upon reception of the image quality control signal, the controller 180 may extract a value corresponding to the received signal from an image quality setting table based on genres and control the display unit 151 to realize image quality corresponding to the extracted value. The table shown in FIG. 19 is an exemplary table including contrast, color, saturation, sharpness and correlated color temperature (CCT) as image quality control factors.

Figure 21:
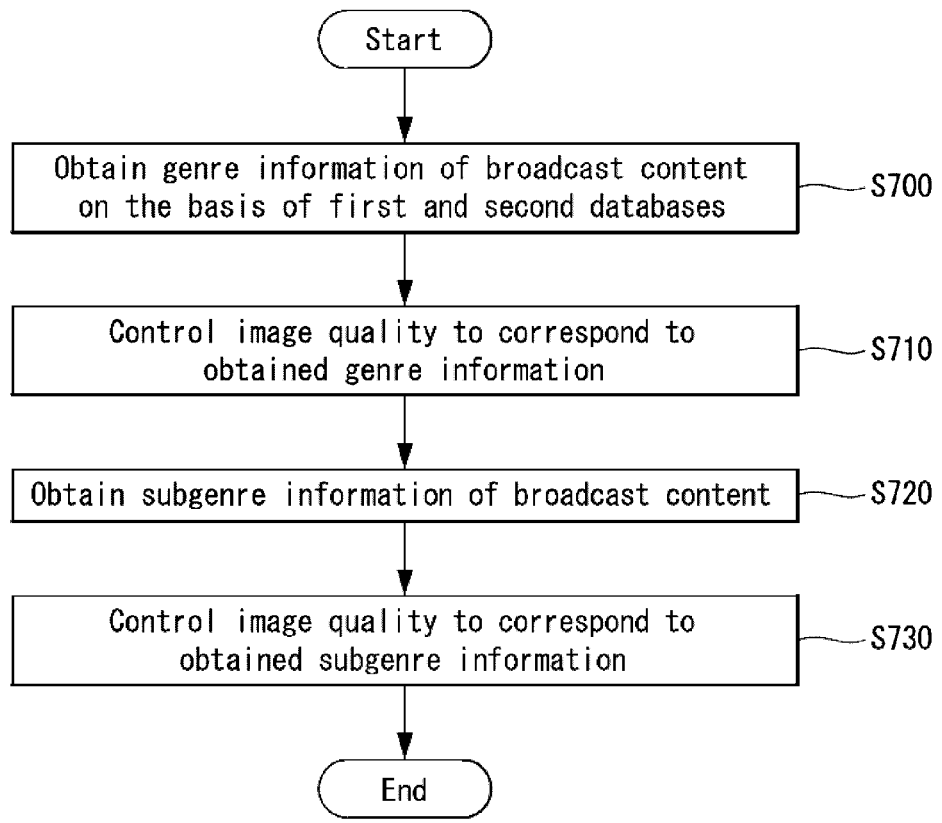
FIG. 21 is a flowchart illustrating another example of a method for driving a broadcast receiving device according to the present invention.

FIG. 21 is a flowchart illustrating another example of a method for driving a broadcast receiving device according to the present invention. Hereinafter, the method of driving a broadcast receiving device will be described with reference to the relevant drawings.

The controller 180 obtains genre information of broadcast content on the basis of the first database generated on the basis of air interface-based EPGs and the second database generated on the basis of Internet-based EPGs (S700) and controls image quality of the display unit 151 to correspond to the acquired genre information (S710).

Thereafter, the controller 180 obtains subgenre information of the broadcast content (S720) and controls the image quality of the display unit 151 to correspond to the obtained subgenre information (S730). Image quality control based on the obtained subgenre information may be performed in more detail than image quality control in step S710.

A description will be given of an example of a method of controlling image quality, shown in FIG. 21, when the genre of the broadcast content is a movie. The controller 180 controls the display unit 151 to realize image quality corresponding to movie genres, recognizes the subgenre of the movie, and controls the display unit 151 to realize image quality corresponding to the subgenre. More specifically, the controller 180 can set image quality realized by the display unit 151 on the basis of whether the genre of the movie is action, horror or fantasy.

Image quality control with respect to the subgenre of the movie may be performed within a range predetermined for all movie genes. For example, when the control range of a specific image quality factor is set to 1 to 100 in a movie genre, it is desirable that the range of image quality control per subgenre be limited to 1 to 100. However, the range of image quality control per subgenre may not be limited thereto as necessary.

While FIG. 21 illustrates that image quality control based on the subgenre of the broadcast content is performed after image quality control for the genre of the broadcast content, the present invention is not limited thereto. For example, the controller 180 may directly obtain the subgenre information of the broadcast content and then directly control image quality realized by the display unit 151 on the basis of the obtained subgenre information.

Figure 22:
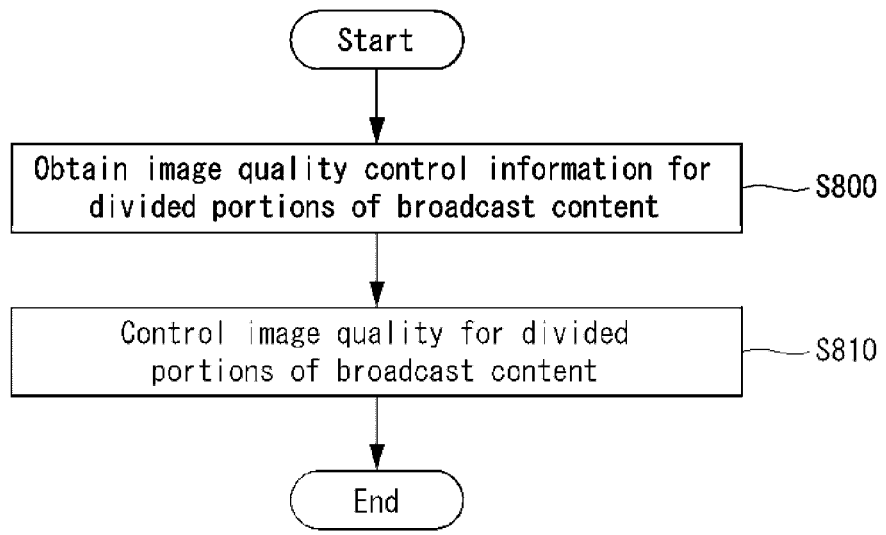
FIG. 22 is a flowchart illustrating another example of a method for driving a broadcast receiving device according to the present invention.

FIG. 22 illustrates another example of a method for driving a broadcast receiving device according to the present invention. Hereinafter, the method of driving a broadcast receiving device will be described with reference to the relevant drawings.

The controller 180 obtains image quality control information of broadcast content for divided portions of the broadcast content on the basis of the first database generated on the basis of air interface-based EPGs and the second database generated on the basis of Internet-based EPGs (S800). Here, the image quality control information for divided portions of the broadcast content may be image quality control factor setting values for the divided portions, which are directly retrieved from the two databases. In addition, the image quality control information for the divided portions of the broadcast content may be indirectly obtained on the basis of video characteristics, genre characteristics or audio characteristics of the respective portions of the broadcast content, which are searched for in the two databases.

Upon acquisition of the image quality control information of the broadcast content for the divided portions thereof, the controller 180 may control image quality of the broadcast content for the respective portions thereof (S810).

A description will be given of examples of a method of controlling image quality according to the method for driving a broadcast receiving device with reference to FIGS. 23 and 24.

Figure 23:
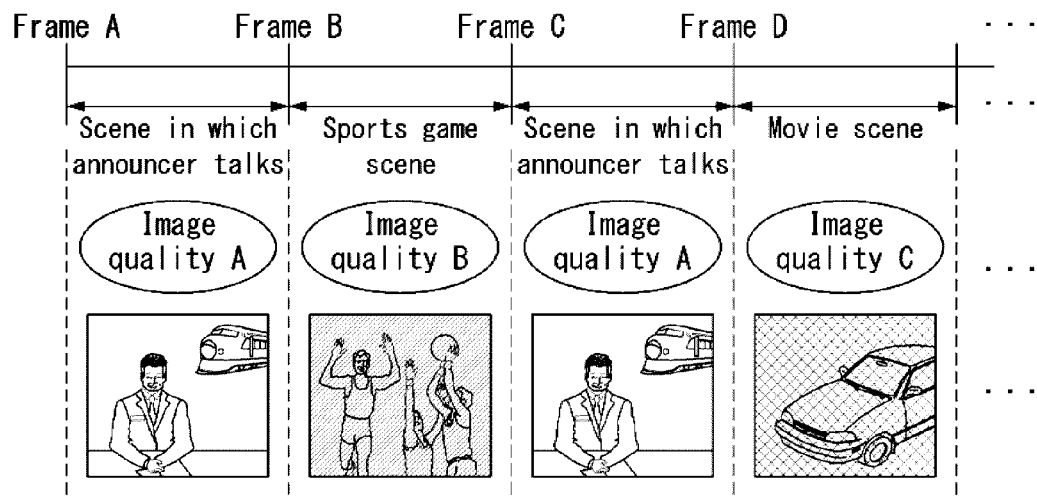
FIG. 23 illustrates an example of controlling image quality of news content on the basis of divided portions of the news content according to the method for driving a broadcast receiving device, shown in FIG. 22.

FIG. 23 illustrates an example of controlling image quality of news content for divided portions of the content according to the method for driving a broadcast receiving device, shown in FIG. 22.

With respect to a portion of the news content corresponding to a scene in which an announcer talks, the controller 180 can control the display unit 151 to realize "image quality A". Image quality A may be default image quality set to the news genre. With respect to a portion of the news content corresponding to a sports game scene, the controller 180 can control the display unit 151 to realize "image quality B". Image quality B may be image quality set to the sports genre.

With respect to a portion of the news content corresponding to another scene in which the announcer talks, the controller 180 can control the display unit 151 to realize "image quality A". With respect to a portion of the news content corresponding to a movie scene following the announcer scene, the controller 180 can control the display unit 151 to realize "image quality C". Here, image quality C may be image quality set to the movie genre.

In this manner, the broadcast receiving device 100 according to the present invention can control the display unit 151 to realize different image qualities for portions of the content, which are divided according to video characteristics, even within one genre.

Figure 24:
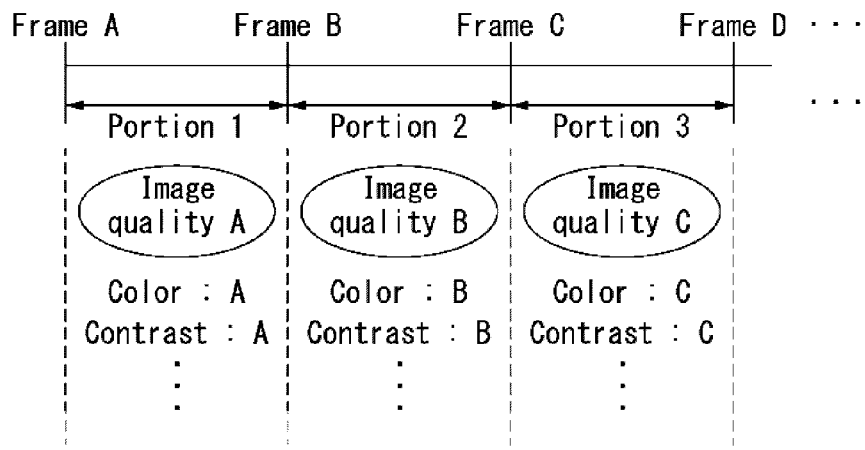
FIG. 24 illustrates an example of controlling image quality of broadcast content on the basis of divided portions of the broadcast content according to the method for driving a broadcast receiving device, shown in FIG. 22.

FIG. 24 illustrates an example of controlling image quality of broadcast content for divided portions of the content according to the method for driving a broadcast receiving device, shown in FIG. 22.

The controller 180 may control the display unit 151 to realize "image quality A" for portion 1. Here, values of image quality factors such as color and contrast corresponding to image quality A may be extracted from the first and second databases. Values of image quality factors corresponding to image quality B and image quality C, which will be described later, may also be extracted from the first and second databases.

The controller 180 may control the display unit 151 to realize "image quality B" for portion 2 and to realize "image quality C" for portion 3.

In this manner, the broadcast receiving device 100 according to the present invention can control image quality for divided portions of broadcast content even within one genre on the basis of image quality control factor values predetermined for the respective portions of the broadcast content.

Figure 25:
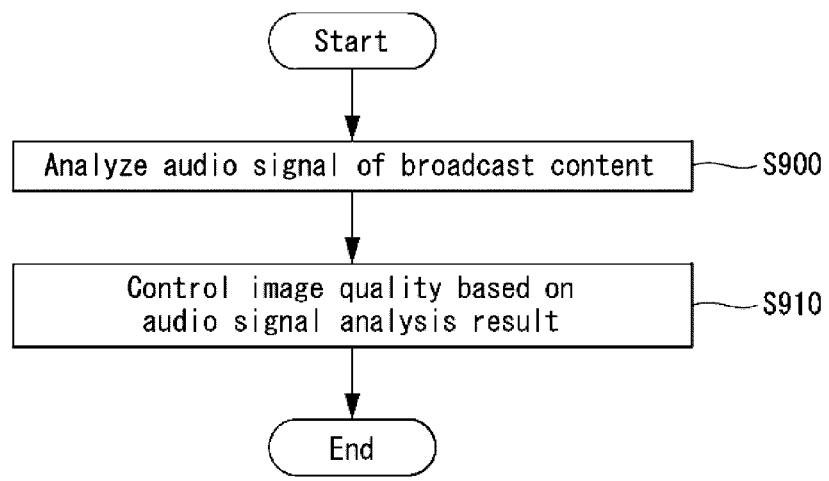
FIG. 25 is a flowchart illustrating another example of a method for driving a broadcast receiving device according to the present invention.

FIG. 25 illustrates another example of a method for driving a broadcast receiving device according to the present invention. Hereinafter, the method of driving a broadcast receiving device will be described with reference to the relevant drawings.

The controller 180 analyzes an audio signal of broadcast content (S900). Thereafter, the controller 180 controls image quality realized by the display unit 151 on the basis of the audio signal analysis result (S910). For example, when the audio signal analysis result corresponds to a portion of the broadcast content in which a voice of a person is output, the controller 180 can control image quality of the display unit 151 such that the skin color of the person is emphasized.

Figure 26:
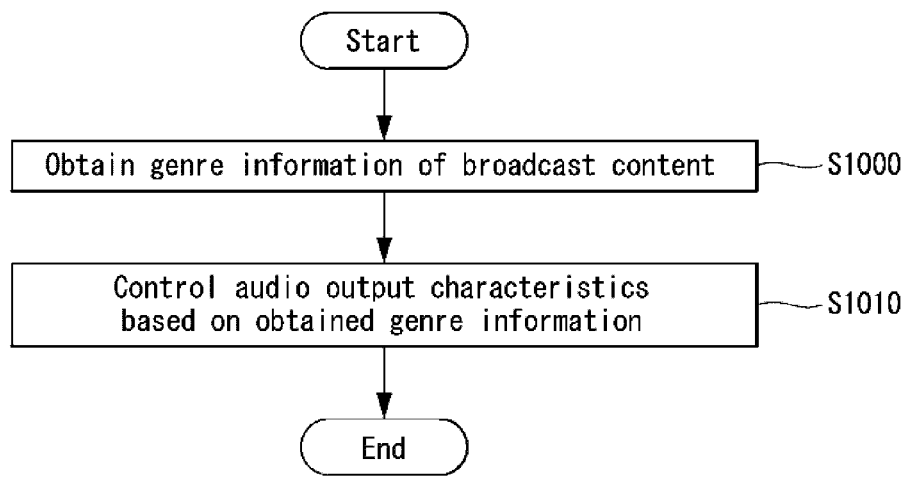
FIG. 26 is a flowchart illustrating another example of a method for driving a broadcast receiving device according to the present invention.

FIG. 26 is a flowchart illustrating another example of a method for driving a broadcast receiving device according to the present invention. Hereinafter, the method of driving a broadcast receiving device will be described with reference to the relevant drawings.

The controller 180 obtains genre information of broadcast content being output (S1000). Then, the controller 180 controls the audio output unit 152 to control audio output characteristics on the basis of the obtained genre information (S1010). Since a process of obtaining the genre information of the broadcast content may be identical or similar to the processes described in the aforementioned examples, detailed description thereof is omitted.

A description will be given of an example of controlling audio output characteristics according to the method for driving a broadcast receiving device. The broadcast receiving device 100 can control the audio output characteristics of the audio output unit 152 such that human voices are emphasized in the case of the news genre and control the audio output characteristics of the audio output unit 152 such that background sounds are emphasized in the case of the documentary genre.

Figure 27:
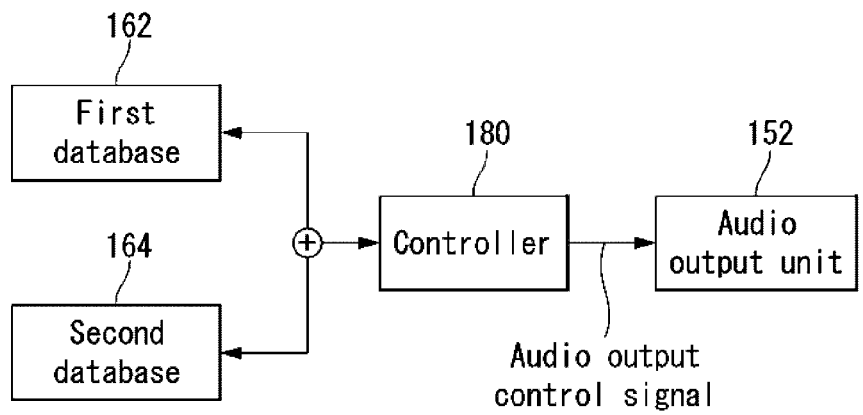
FIG. 27 is a block diagram for explaining a process of implementing the method for driving a broadcast receiving device shown in FIG. 26.

FIG. 27 is a block diagram illustrating a process of implementing the method for driving a broadcast receiving device, shown in FIG. 26. In the following description, the method for driving a broadcast receiving device, shown in FIG. 16, is applied to the configuration of FIG. 27.

The controller 180 obtains genre information of broadcast content being output by searching the first database 162 in which broadcast-related information generated on the basis of broadcast-based EPGs is stored and the second database 164 in which broadcast-related information generated on the basis of Internet-based EPGs is stored.

Subsequently, the controller 180 generates an audio output control signal for controlling the audio output unit 152 to implement audio output characteristics predetermined corresponding to the obtained genre information and outputs the audio output control signal to the audio output unit 152. Then, the audio output unit 152 can implement audio output characteristics corresponding to the broadcast content in response to the audio output control signal.

The aforementioned audio output characteristic control in the broadcast receiving device 100 according to the present invention may be performed by applying subgenre information of the broadcast content thereto or performed for divided portions of the broadcast content.

Figure 28:
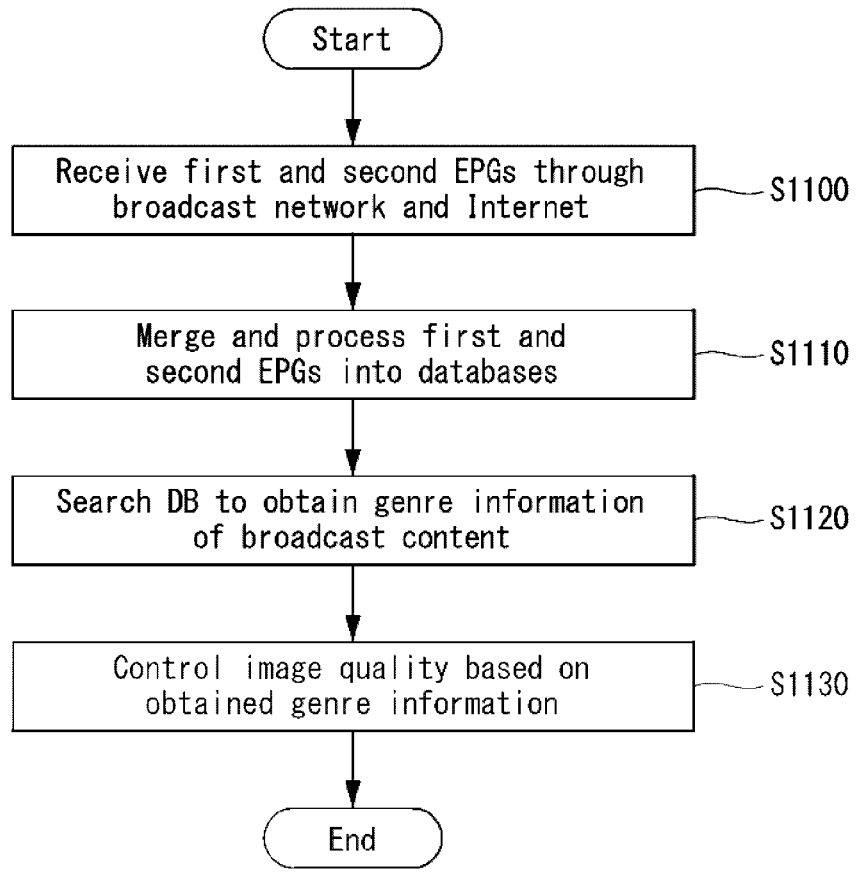
FIG. 28 is a flowchart illustrating another example of a method for driving a broadcast receiving device according to the present invention.
Figure 29:
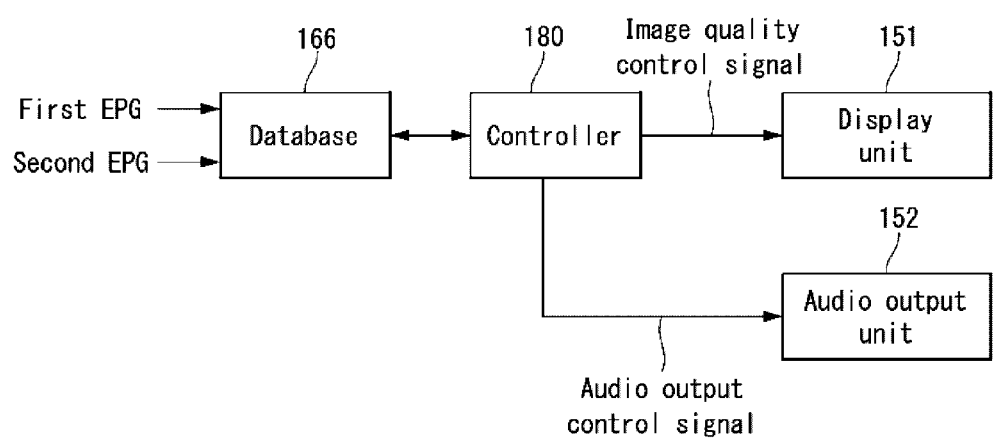
FIG. 29 is a block diagram for explaining a process of implementing the method for driving a broadcast receiving device shown in FIG. 28.

FIG. 28 is a flowchart illustrating another example of a method for driving a broadcast receiving device according to the present invention and FIG. 29 illustrates an example of a process for implementing the method for driving a broadcast receiving device, shown in FIG. 28.

A first EPG is received through a broadcast network and a second EPG is received through the Internet (S1100). Thereafter, the controller 180 generates broadcast-related information by merging and processing the first EPG and the second EPG, makes the generated broadcast-related information into a database 166 and stores the same in the data storage unit 160 (S1110). The procedure of merging and processing the first EPG and the second EPG has been described above and thus detailed description thereof is omitted.

Subsequently, the controller 180 obtains genre information of broadcast content being output by searching the database 166 (S1120) and controls image quality of the display unit 151 on the basis of the obtained genre information (S1130). Here, the controller 180 generates an image quality control signal for controlling at least one image quality factor and delivers the image quality control signal to the display unit 151 in order to realize image quality corresponding to the obtained genre information.

The controller 180 may control output characteristics of sounds output through the audio output unit 152 on the basis of the obtained genre information. Here, the controller 180 generates an audio output control signal for controlling at least one audio factor and delivers the audio output control signal to the audio output unit 152 in order to realize audio output characteristics corresponding to the obtained genre information.

The procedure of merging and processing air interface-based EPGs and Internet-based EPGs, storing the same as databases and managing the databases, genre information and subgenre information of broadcast content, obtained on the basis of the EPGs, image quality information for divided portions of broadcast content, audio analysis results and the like, illustrated in FIG. 28, may be applied to the embodiments described with reference to FIGS. 13 to 27. However, this is apparent to those skilled in the art and thus detailed description thereof is omitted.

The method for controlling a broadcast receiving device according to an embodiment of the present invention may be implemented in the form of a program command that may be performed through various computer units and recorded in a computer-readable medium. The computer-readable recording medium may include a program command, a data file, a data structure, and the like, alone or in a form of a combination thereof. A program command recorded in the medium may be particularly designed or configured for the present invention or may be known to be used by a computer software person in the art.

Examples of the computer-readable recording medium include a hardware device particularly configured to store and perform a program command, such as a magnetic medium such as a hard disk, a floppy disk, or a magnetic tape, an optical medium such as a CD-ROM or a DVD, a magneto-optical medium such as a floptical disk, and a ROM, a RAM, a flash data storage unit, or the like. Examples of program commands include high level language codes that may be executed by a computer using an interpreter, or the like, as well as mechanical language codes created by a compiler. The hardware device may be configured to operate by one or more software modules to perform processing according to an exemplary embodiment of the present disclosure, and vice versa.

Hereinabove, although the present invention is described by specific matters, exemplary embodiments, and drawings, the present invention is not limited to the exemplary embodiments and various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

The invention claimed is:

1. A broadcast receiving device, comprising:
   a data storage unit;
   a communication unit configured to receive a first electronic program guide (EPG) through a broadcast network and to receive a second EPG through the Internet; and
   a controller configured to:
   process the first EPG to generate first broadcast-related information,
   process the second EPG to generate second broadcast-related information, and
   make the first broadcast-related information and the second broadcast-related information into databases having different data structures and store the databases in the data storage unit,
   wherein, when a broadcast-related information request is received from an application being executed, the controller selectively searches one of the databases having different data structures to obtain requested broadcast-related information and delivers the obtained broadcast-related information to the application,
   wherein the application comprises at least one of a broadcast guide, a viewing reservation, a channel banner or a social center, and
   wherein the controller is further configured to:
   change priorities of the first and second broadcast-related information according to a country in which the broadcast receiving device is driven,
   select, when a country determined on the basis of the first EPG differs from a country determined on the basis of the second EPG, the country determined on the basis of the first EPG as a country in which the broadcast receiving device is driven, and
   change an Internet address for receiving EPGs through the Internet to an Internet address determined in advance for the selected country.

2. The broadcast receiving device of claim 1, wherein the controller is configured to:
   obtain the requested broadcast-related information from the second broadcast-related information or merge and analyze the first and second broadcast-related information to obtain the requested broadcast-related information when the Internet is connected.

3. The broadcast receiving device of claim 1, wherein the controller is configured to selectively search one of the databases having different data structures according to a predetermined priority varying depending on the requested broadcast-related information or the application being executed.

4. The broadcast receiving device of claim 2, wherein, when specific broadcast-related information is not included in one of the first and second broadcast-related information and is included in the other of the first and second broadcast-related information, and a request for the specific broadcast-related information is received, the controller is configured to give a higher priority to the other broadcast-related information for the specific broadcast-related information.

5. The broadcast receiving device of claim 2, wherein, when the controller obtains specific broadcast-related information requested by the application being executed by searching for both the first and second broadcast-related information, and when search results with respect to the specific broadcast-related information in the first and second databases are not identical, the controller is configured to select information retrieved from one of the first broadcast-related information and the second broadcast-related information on the basis of reliability priority predetermined for the specific broadcast-related information.

6. The broadcast receiving device of claim 1, wherein, when the country in which the broadcast receiving device is driven is determined to be a predetermined specific country, the controller is configured to merge and analyze the first and second broadcast-related information, to make the merged first and second broadcast-related information into a database and to store the database in the data storage unit.

7. The broadcast receiving device of claim 3, wherein, when specific broadcast-related information is not included in one of the first and second broadcast-related information and is included in the other of the first and second broadcast-related information, and a request for the specific broadcast-related information is received, the controller is configured to give a higher priority to the other broadcast-related information for the specific broadcast-related information.

8. The broadcast receiving device of claim 3, wherein, when the controller obtains specific broadcast-related information requested by the application being executed by searching for both the first and second broadcast-related information, and when search results with respect to the specific broadcast-related information in the first and second databases are not identical, the controller is configured to select information retrieved from one of the first broadcast-related information and the second broadcast-related information on the basis of reliability priority predetermined for the specific broadcast-related information.

* * * * *